(12) United States Patent
Altenhof et al.

(10) Patent No.: US 8,347,775 B2
(45) Date of Patent: Jan. 8, 2013

(54) KINETIC ENERGY DISSIPATION SYSTEM FOR DISSIPATING KINETIC SHOCK ENERGY

(75) Inventors: William Jack Altenhof, Lakeshore (CA); Shun Yi Jin, Windsor (CA); Amitabha Majumber, Saskatoon (CA)

(73) Assignee: University of Windsor, Windsor, Ontario ( * ) Notice: Subject to any disclaimer, the term of this patent is extended or adjusted under 35 U.S.C. 154(b) by 77 days.

(21) Appl. No.: 12/926,747

(22) Filed: Dec. 7, 2010

(65) Prior Publication Data

US 2011/0163558 A1 Jul. 7, 2011

Related U.S. Application Data

(60) Provisional application No. 61/282,047, filed on Dec. 8, 2009.

(51) Int. Cl.
*F41H 7/00* (2006.01)
*B60R 19/42* (2006.01)

(52) U.S. Cl. ......... 89/36.08; 89/36.02; 293/128

(58) Field of Classification Search ...... 89/36.01–36.04, 89/36.07–36.12, 36.17; 293/128; 296/187.12; 428/911; 109/49.5
See application file for complete search history.

(56) References Cited

U.S. PATENT DOCUMENTS

| | | | | |
|---|---|---|---|---|
| 7,832,762 | B2 * | 11/2010 | Breed | 280/735 |
| 8,061,257 | B2 * | 11/2011 | Tonyan et al. | 89/36.02 |
| 8,074,761 | B2 * | 12/2011 | LaTurner et al. | 180/274 |
| 2007/0205066 | A1 * | 9/2007 | Vinayagamurthy et al. | 188/376 |
| 2008/0082237 | A1 * | 4/2008 | Breed | 701/45 |
| 2008/0243342 | A1 * | 10/2008 | Breed | 701/45 |
| 2011/0079978 | A1 * | 4/2011 | Schreiner et al. | 280/124.1 |
| 2012/0074721 | A1 * | 3/2012 | LaTurner et al. | 293/133 |

OTHER PUBLICATIONS

McGregor, I.J., Meadows, D.J., Scott, C.E., and Seeds, A.D., 'Impact performance of aluminium structures', In: Structural crashworthiness and failure (Jones, N. and . . . .
K.R.F. Andrews et al. "Classification of the axial collapse of cylindrical tubes under quasi-static loading", Int J Mech Sci, 25, 1983 pp. 687-696.
Guillow, S.R., Lu, G. And Grzebieta, R.H., 'Quasi-static axial compression of thin-walled circular aluminium tubes', Int J Mech Sci, 2001 43 (9) 2103-2123.
Jensen, O., Langseth, M. and Hopperstad, O.S., 'Transition between progressive and global buckling of aluminium extrusions', Structures Under Shock and Impact VII, Southampton.
Jensen, O., Langseth, M. and Hopperstad, O.S., "Experimental investigations on the behaviour of short to long square aluminium tubes subjected to axial loading", International.
Karagiozova, D. and Alves, M., 'Transition from progressive buckling to global bending of circular shells under axial impact—Part I: Experimental and numerical observations'.
Galib, D.A. andLimam, A., 'Experimental and numerical investigation of static and dynamic axial crushing of circular aluminium tubes', Thin-Walled Struct, 2004 42 1103-1137.

(Continued)

*Primary Examiner* — Michael David

(57) ABSTRACT

An energy dissipation assembly is provided for mounting between a fixed support and moveable support. The assembly includes a sacrificial deformation tube, a hardened cutter/deflector assembly and, optionally, a connecting cable to maintain the cutter/deflector assembly in juxtaposed coaxial alignment with an end deformation tube. The cutter/deflector assembly has a generally flattened disc shaped profile and includes a central hub, a circular support ring and one or more cutting blades. The support ring is concentrically about the hub and has an inner diameter greater than the outer tube diameter. On the occurrence of a shock force, the cutter/deflector assembly moves axial to cut/deform the deformation tube to dissipate force energy.

9 Claims, 16 Drawing Sheets

OTHER PUBLICATIONS

Abah, L., Limam, A. and Dejeammes, M., 'Effects of cutouts on static and dynamic behaviour of square aluminium extrusions', In: Jones, N., Talaslidis, D.G., Brebbia, C.A., and.

Arnold, B. and Altenhof, W., 'Experimental observations on the crush characteristics of AA6061-T4 and T6 structural square tubes with and without circular discontinuities', in.

Cheng, Q., Altenhof, W. and Li, L., Experimental investigations on the crush behaviour of AA6061-T6 aluminium square tubes with different types of through-hole discontinuitie.

Reddy, T.Y. and Reid, S.R., 'Axial splitting of circular metal tubes', Int J Mech Sci, 1986 28 (2) 111-131.

Huang, X., Lu, G. and Yu, T.X., 'Energy absorption in splitting square metal tubes', Thin-Walled Struct, 2002 40 (2) 153-165.

Huang, X., Lu, G. and Yu, T.X., 'On the axial splitting and curling of circular metal tubes', Int J Mech Sci, 2002 44 (11) 2369-2391.

Jin, S.Y., Altenhof, W. and Kapoor, T., 'An experimental investigation into the cutting deformation mode of AA6061-T6 round extrusions', Thin-Walled Struct, 2006 44 (7) 773-78.

Simonsen, B.C. and Wierzbicki, T., 'Plasticity, fracture and friction in steady-state plate cutting', Int. J. Impact Eng, 1998 21 (5) 387-411.

Zheng, Z.M. and Wierzbicki, T., 'A theoretical study of steady-state wedge cutting through metal plates', Int. J. of Fracture, 1996 78 (3/4) 45-66.

Majumder, A., Altenhof, W., Vijayan, V. and Jin, S.Y., 'Quasi-static axial cutting of AA6061-T4 and T6 round extrusions', IMechE Part L: J. Materials: Design and Applications,.

Jin, S.Y. and Altenhof, W., 'Experimental observations of AA6061-T6 round extrusions under a cutting deformation mode with a deflector', Int. J. Crashworthiness, 2008 13 (2) 1.

Jin, S.Y., Majumder, A., Altenhof, W. And Green, D., 'Axial cutting of AA6061-T6 circular extrusions under impact using single- and dual-cutter configurations', In Press: Inte.

ASTM B918 'Standard Practice for Heat Treatment of Wrought Aluminium Alloys', ASTM International, Annual Book of ASTM standards 2002, v02.02, 622-635.

Alexander, J.M., 'An approximate analysis of the collapse of thin cylindrical shells under axial loading', The Quarterly Journal of Mechanics and Applied Mathematics, 1960 13.

Abramowicz, W. and Jones, N., 'Dynamic progressive buckling of circular and square tubes', Int J Impact Eng, 1986 4 (4) 243-270.

Jones, N., 'Structural Impact', Cambridge, Cambridge University Press, 1989.

Pugsley, S.A. and Macaulay, M., 'The large-scale crumpling of thin cylindrical columns', The Quarterly Journal of Mechanics and Applied Mathematics, 1960 13 (1) 1-9.

Maiden, C.J. and Green, S.J., 'Compressive strain-rate tests on six selected materials at strain rates from 10-3 to 104 in/in/sec', Journal of Applied Mechanics, 1966 v33 496-.

* cited by examiner

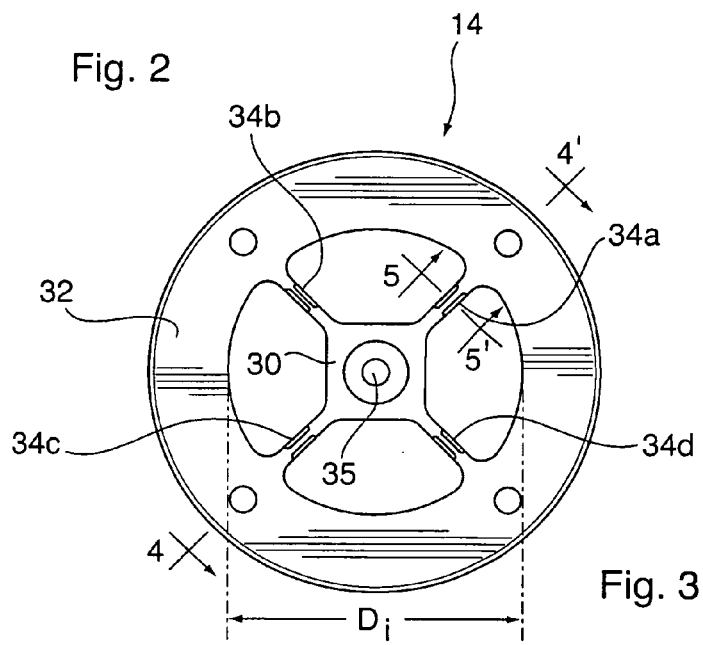
Fig. 2
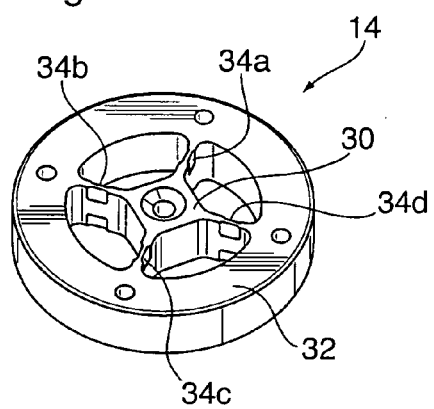
Fig. 3
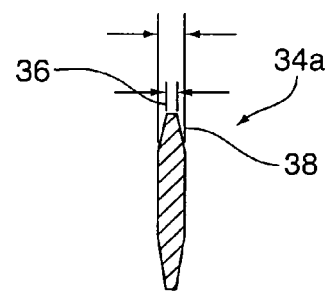
Fig. 4
Fig. 5

Fig. 6
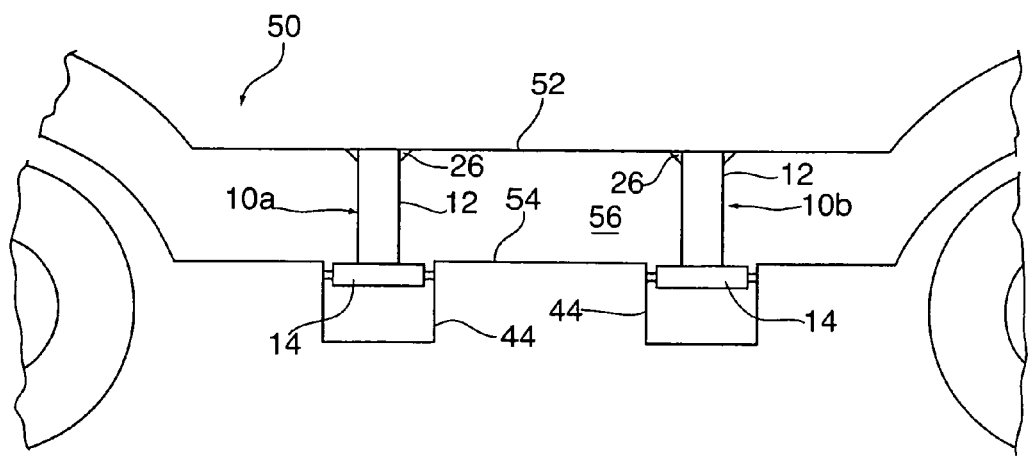
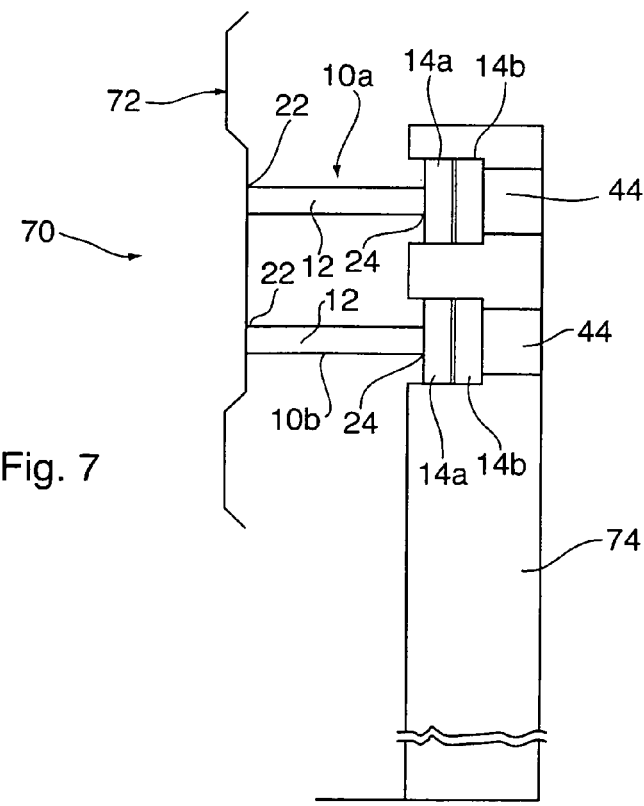
Fig. 7

KINETIC ENERGY DISSIPATION SYSTEM FOR DISSIPATING KINETIC SHOCK ENERGY

RELATED APPLICATIONS

This application claims the benefit of 35 U.S.C. §119(e) to U.S. Provisional Patent Application Ser. No. 61/282,047, filed Dec. 8, 2009.

SCOPE OF THE INVENTION

The present invention relates to a device used to dissipate and/or absorb energy, and more preferably, an apparatus which may be incorporated into a vehicle, a crash barrier, or other device or structure to linearly dissipate the kinetic energy of a shock or impact force.

BACKGROUND OF THE INVENTION

Shock absorbers for absorbing and dissipating the kinetic energy of impact or shock force are well known. Conventionally destructive shock forces are dissipated by energy absorbing devices such as springs, rubber buffers or hydraulic fluids. Conventional spring and/or elastomeric shock absorbers suffer a disadvantage, however, in that they typically do not dissipate energy at a uniform rate. Conventional shock absorbers deform through the elastic limit of the deforming material resulting in varying rates at which the energy is absorbed. Also the rate of energy dissipation changes with the speed of the crash limiting their predictability. Where hydraulic cylinders are used to control discharge fluids, such as in shock absorbers, fluid is compressed and then released through a controlled outlet/bypass which dissipates the energy. However, on compression the energy transmitted through these devices increases at a geometric rate relative to speed of collapse of the cylinder thus passing the peak energy through the device and dissipating the lower levels of energy at the beginning and end of the crash. Further, heretofore, conventional shock absorbers have achieved mixed results in absorbing and/or dissipating high shock forces, such as those produced by falling elevators, traffic accidents or improvised explosive devices (IEDs).

The applicant has appreciated that a simplified energy dissipation system may be achieved by providing a cutting member and a sacrificial deformation plate or member which on an impact is cut and/or deformed by the cutting member. In a most simplified form, the deformation member is a cylindrical or circular tube of mean diameter (D) and thickness (t) which experiences a stable progressive folding deformation as an efficient energy absorbing member.

Jensen et al. 'Transition between progressive and global buckling of aluminium extrusions', *Structures Under Shock and Impact VII*, Southampton, WIT Press, 2002, 267-277; and "Experimental investigations on the behavior of short to long square aluminium tubes subjected to axial loading", *International Journal of Impact Engineering*, 2004 30 973-1003), the disclosures of which are incorporated herein by reference, numerically and experimentally investigated the transition of square aluminum alloy tubes extrusions and found that the energy absorption was dependent on the collapse mode. In particular, total energy absorption decreases when the impact velocity due to inertia forces increased to prevent the global bending of the tube and the early transition from progressive to global bending. An increasing relationship was observed between the L/b and the b/t ratios in the quasi-static tests and impact tests with a velocity of less than 13 m/s, (where b is the width of the extrusion). An inverse relationship was found when the impact velocity was 20 m/s. Thus, the overall response is found to be highly dependent on the location of the first lobes.

Karagiozova and Alves 'Transition from progressive buckling to global bending of circular shells under axial impact—Part I: Experimental and numerical observations', *International Journal of Solids and Structures*, 2004 41 1565-1580, the disclosure of which is incorporated herein by reference, experimental tests on the bending of circular tubes showing that the critical length ($L_{cr}$) is influenced by the impact velocity. Numerically, it was observed that circular extrusions made of ductile alloys with a high yield stress and low strain hardening characteristics had a better energy absorption performance than extrusions with a low yield stress and high strain hardening characteristics.

Earlier studies show that given a certain material and particular D/t ratio, and $L_{cr}$ exists under quasi-static loading. However, for a dynamic loading condition, the collapse mode of an extrusion depends not depend only on material properties, boundary conditions and extrusion geometries, but also on the impact velocity. Furthermore, geometrical imperfections may play a more important role in the dynamic crush conditions.

Galib and Limam Experimental and numerical investigation of static and dynamic axial crushing of circular aluminium tubes', *Thin-Walled Struct*, 2004 42 1103-1137, the disclosure of which is incorporated herein by reference, describe the crushing of circular aluminum extrusions subjected to variable impact mass and impact velocity values. The progressive folding deformation modes of circular extrusions under both dynamic and static loading are generally the same with the main difference related to the first part of the impact, where a dynamic force is approximately 40-60% higher than a static one. Following this initial high peak force, crush forces oscillated significantly during the formation of the lobes in both loading conditions. The mean dynamic crush forces were about 10% higher than the corresponding values in the quasi-static tests, which indicated the strain rate insensitivity property of this type of material.

With the attempts to control and stabilize the collapse mode and improve the energy absorption capability of the extrusions under axial loading conditions, geometrical discontinuities, due to the easy implementation, are commonly used to initiate a specific collapse mode and improve energy absorption.

Abah et al. "Effects of cutouts on static and dynamic behavior of square aluminium extrusions", In: Jones, N., Talaslidis, D. G., Brebbia, C. A., and Manolis, G. D., Editors, *Structures Under Shock and Impact V*, Computational Mechanics, Southampton, UK, 1998, 133-152, the disclosure of which is incorporated herein by reference, describe the effects of circular cutouts at the four edges of square aluminum extrusions, whereby up to 50% reduction of the peak forces was observed depending on the size of the cutout and loading condition, however, the mean crush load remained relatively constant for both loading conditions.

Arnold and Altenhof "Experimental observations on the crush characteristics of AA6061-T4 and T6 structural square tubes with and without circular discontinuities", *Int J Crashworthiness*, 2004 9 (1) 829-854), and Cheng and Altenhof "Experimental investigations on the crush behavior of AA6061-T6 aluminium square tubes with different types of through-hole discontinuities", *Thin-Walled Struct*, 2006 44 (4) 441-454, the disclosures of which are incorporated herein by reference, describe deformation results for square extrusions with circular discontinuity, or circular, slotted and elliptical holes under quasi-static axial loading. Arnold and Altenhof and Chen and Altenhof, supra, show that a significant reduction of the initial peak crush load and higher crush force efficiency (CFE) of the extrusions. Furthermore, energy absorption capacity may be improved by altering the deformation mode within the extrusion, through the implementation of the geometrical discontinuities within the tubular member.

While control of the collapse mode of the extrusions is reliable under the quasi-static axial loading through the implementation of initiators, the initiation of the desired deformation mode under impact loading becomes more complicated and may lead to a very poor energy absorption mode since the collapse mode greatly depends on the impact velocities. The applicant has appreciated that this collapse mode dependency of extrusions can be eliminated when for example a cylindrical tubular member is configured to experience a splitting or cutting deformation mode. Reddy and Reid "Axial splitting of circular metal tubes", *Int J Mech Sci*, 1986 28 (2) 111-13), the disclosure of which is incorporated herein by reference, describe the splitting of mild steel and aluminium circular tubes under both quasi-static and dynamic axial loading conditions using a mandrel type of die. Crack formations were observed for all tests with or without pre-slits on extrusions. The cracked extrusions then generated strips which curled afterwards. A peak load was observed along with the formation of the splitting mode and a steady crush force was also observed during the steady state splitting process. Such a mode of deformation illustrated a stroke efficiency greater than 90%, although it is not as efficient as a tube undergoing axial crush or inversion.

Huang et al. [11-12] (Huang, X., Lu, G and Yu, T. X, 'Energy absorption in splitting square metal tubes', *Thin-Walled Struct*, 2002 40 (2) 153-165 and 'On the axial splitting and curling of circular metal tubes', *Int J Mech Sci*, 2002 44 (11) 2369-2391), the disclosure of which is incorporated herein by reference, investigated the quasi-static axial splitting behaviour of circular and square mild steel and aluminium tubes using a conical die. Three stable energy dissipation mechanisms were reported, namely, a 'near tip' tearing and splitting of the tube, a 'far-field' plastic bending and stretching of curls, and a dissipation mechanism associated with friction due to the interaction of the tube with the die.

Jin et al. "An experimental investigation into the cutting deformation mode of AA6061-T6 round extrusions", *Thin-Walled Struct*, 2006 44 (7) 773-786, the disclosure of which is incorporated herein by reference, describes cutting deformation of cylindrical aluminum (AA6061-T6) extrusions under a quasi-static loading condition using a cutter. The cutting deformation mode of the circular extrusion was observed to be very stable and controllable. An extremely high crush force efficiency of 95% and a constant steady-state cutting force were reported, which led to ideal energy absorption characteristics. The cutting process was identified as clean cut due to the observed Load/displacement response.

Majumder et al. 'Quasi-static axial cutting of AA6061-T4 and T6 round extrusions', *IMechE Part L: J. Materials: Design and Applications*, 2008 222 183-195, the disclosure of which is incorporated herein by reference, describes cutting deformation behaviour of circular AA6061-T6 and T4 extrusions under quasi-static loading conditions with two different extrusion wall thicknesses (t) of 3.175 mm and 1.587 mm using cutters described in Jin, supra. It was observed that T6 temper extrusions with both wall thicknesses and T4 temper extrusion with t=3.175 mm exhibited a clean cut, while T4 temper extrusion with t=1.587 mm showed braided cut. The steady state force reduced approximately 50% when the extrusion wall thickness reduced 50% for both temper extrusions. The cutting deformations were observed to be very stable and repeatable.

Jin and Altenhof 'Experimental observations of AA6061-T6 round extrusions under a cutting deformation mode with a deflector', *Int. J. Crashworthiness*, 2008 13 (2) 127-138, the disclosure of which is incorporated herein by reference, further describes cutting deformation behaviour of circular AA6061-T6 extrusion with the presence of curved and straight deflectors. In particular, it is shown that the CFE decreased from 95% to 81% and 68% with the presence of the curved deflector and straight deflector respectively. A constant cutting force was observed after the extrusion petalled sidewalls contacted the deflector and bent outwards. The cutting deformations with the deflector appeared to be stable and controllable.

Jin et al. "Axial cutting of AA6061-T6 circular extrusions under impact using single- and dual-cutter configurations', In Press: *International Journal of Impact Engineering*, 2009, doi:10.1016/j.ijimpeng.2009.01.003, the disclosure of which is incorporated hereby reference further describes energy absorption behaviour of circular AA6061-T6 extrusions under dynamic and quasi-static loadings using single- or dual-cutter and a deflector assembly. It was observed that the total energy absorption of the extrusion experienced by the single cutting deformation was typically less compared to the progressive folding deformation, but much greater than the global bending deformation. The total energy absorption of the extrusions experienced by the dual stage cutting mode surpassed the progressive folding mode. Dual stage cutting is typically a superposition of two single stage cutting processes with a displacement delay, on the increased force due to the second series of cuts, approximately equal to the cutter thickness.

SUMMARY OF THE INVENTION

The present invention relates to an assembly for the absorption and/or dissipation of energy, such as a shock force produced by a vehicle crash, elevator failure, or for example explosions caused by explosive forces caused by the detonation of a mine, improvised explosive devices and the like. In this regard, the assembly is provided with a deformable energy dissipating member, tube, plate, or rod; and a cutter/deflector assembly which on the occurrence of the shock force is driven into and/or through the energy dissipating member to effect its deformation, to dissipate and/or absorb the energy forces thereby.

One object of the present invention is to provide a simplified shock absorber or energy dissipation device which may be easily and economically constructed, and which is suitable for dissipating kinetic energy forces, including, without restriction, high energy shock forces such as those produced by vehicle collisions, IEDs, falling elevators and the like.

Another object of the invention is to provide an energy dissipation device which may be easily and inexpensively manufactured.

A further object of the invention is provide a shock absorber or energy dissipation device which may be easily tuned or customized to absorb or dissipate a mechanical shock of a preselected magnitude.

In one embodiment, the invention provides an energy dissipation system or absorber for the dissipation of kinetic energy from a shock or impact force by the resistive force of one or more cutting blades cutting longitudinally into a sacrificial rigid-walled structure. In one possible construction, the sacrificial structure may be provided as curved or solid plate, or as a solid, or polygonally-shaped tube, but most preferably is formed as a deformable cylindrical tube. The applicant has appreciated that the resistive force of the cutter is constant relative to the wall thickness of the sacrificial walled member and that energy absorbed by the distance the cutter moves through the sacrificial member is not affected by the cutter speed.

In another simplified construction, the invention provides a single use emergency energy absorber system for use in conjunction with a blast or crash protection device for absorbing or dissipating shock kinetic energy. The device may include a sacrificial deformation member, which in the event of a blast force or collision, deforms to absorb the energy of the collision/blast.

In a preferred construction, the invention is able to limit the peak energy that is transmitted through the device by the use of a cylindrical sacrificial deformation tube, regardless of the speed of the crash or input shock force to a predetermined value. Further the device can be designed to vary the amount of non-dissipated energy is transmitted through the device, based on a predetermined energy curve value, by varying the length and/or wall thickness of the tube and/or the number of cutting blades used on the cutter to effect tube deformations.

In one aspect, the present invention resides in an assembly for dissipating kinetic energy, the assembly comprising: a generally rigid deformable member; a cutting/deflector assembly having at least one cutting blade member, said cutting assembly being displaceable relative to said deformable member to move said at least one blade member at least partially through said deformable member and wherein movement of the at least on butting blade through said deformable member cuts and/or deforms said deformable member to assist in dissipating said kinetic energy.

In another aspect, the present invention an energy dissipation system for dissipating kinetic shock energy including: an aluminum tubular member, said tubular member extending longitudinally along an axis from a first end portion to a second end portion, said tubular member having a longitudinal length selected at between 5 and 50 cm and a radial diameter of about 4 to 10 cm, at least one hardened cutter/deflector plate disposed adjacent to said first end portion, each cutter/deflector plate including three to five cutting blade members wherein on the occurrence of said shock energy, said cutting blades being movable longitudinally relative to said tubular member towards said second end portion, wherein longitudinal movement of the cutting blades through the tubular member cuts and/or deforms said tubular member to assist in absorbing said kinetic energy.

In yet another aspect, the present invention provides for a method and system for the control of load/displacement response of an energy absorption device for the best protection of important structures, apparatus, occupants or other properties.

BRIEF DESCRIPTION OF THE DRAWINGS

Reference may now be had to the following detail description, taken together with the accompanying drawings, in which:

FIG. 1a shows an enlarged partial view of the sidewall of the deformation tube used in the assembly of FIG. 1;

FIG. 2 shows schematically a top view of the cutter/deflector plate used in the energy dissipation assembly of FIG. 1;

FIG. 3 illustrates a perspective view of the cutter/deflector plate shown in FIG. 2.

FIG. 4 shows a cross-sectional view of the cutter/deflector plate shown in FIG. 2 taken along lines 4-4';

FIG. 5 shows a cross-sectional view of cutting blade used in the cutting/deflector plate of FIG. 2 taken along lines 5-5';

FIG. 6 shows a partial schematic view of a light armoured vehicle showing the positioning of multiple energy dissipation assemblies of FIG. 1 therein in accordance with the present invention;

FIG. 7 shows a schematic side view of a crash guardrail system showing the positioning of multiple energy dissipation assemblies therein in accordance with an alternate embodiment of the invention;

DETAILED DESCRIPTION OF THE PREFERRED EMBODIMENTS

Figure 1:
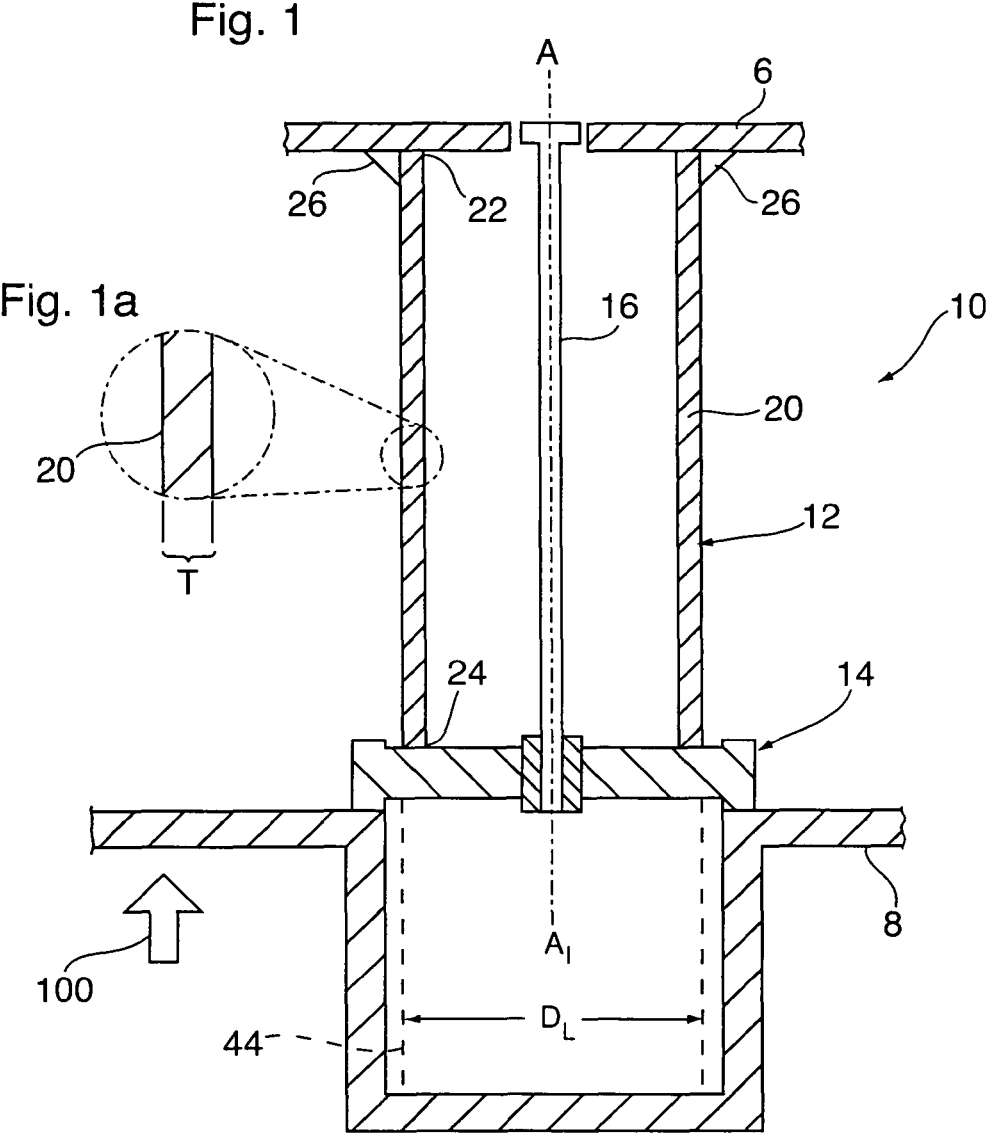
FIG. 1 shows a cross-sectional view of an energy dissipation assembly in an initial assembly position prior to impact forces.

Reference is made to FIG. 1 which illustrates a kinetic energy dissipation assembly 10 in accordance with a preferred embodiment of the invention. The energy dissipation assembly 10 is illustrated schematically as being mounted between a fixed support 6 and moveable support 8 which is susceptible to receive an impact shock force. The dissipation assembly 10 is shown as including a sacrificial aluminium deformation tube 12, a hardened steel cutter/deflector plate 14 and, optionally, a connecting cable 16 provided to assist in maintaining the cutter/deflector plate 14 in a desired initial positioning co-axially aligned relative to the deformation tube 12.

In a most preferred construction, the deformation tube 12 is formed as a circular or cylindrical aluminum or aluminum alloy extrusion having a cylindrical sidewall 20 which extends axially along a longitudinal axis $A_1$-$A_1$ from a first tube end 22 to a second tube 24. The deformation tube 12 preferably has a diameter of between about 3 and 25 cm, and more preferably about 4 to 10 cm and longitudinal length which most preferably is selected at between about 5 to 50 cm, and more preferably about 25 to 35 cm. It is to be appreciated, however, that depending upon the application, deformation tubes with longer or shorter lengths and/or different radius may be adopted. In a simplified construction, the tube sidewall 20 has a radially thickness (t) selected at between about 2 and 15 mm, and more preferably between about 3 to 5 mm. The final thickness (t) of the sidewall 20 will, however, depend on the shock forces to be absorbed.

In the embodiment shown, the deformation tube 12 is mounted directly to the fixed support 6 by weldments 26, so as to be seated thereagainst. In a most preferred construction, the deformable tube 12 is oriented with its longitudinal axis $A_1$-$A_1$ generally normal to the orientation of the fixed support 6. While weldments 26 provide a simplified assembly, in alternate constructions, the deformation tube 12 could be secured in position relative to the support 6 by way of mounting collars, straps, or mechanical fasteners.

Where the dissipation assembly 10 is provided as a preassembly, the connecting cable 16 is used to maintain the relative positioning of the cutter/deflector plate 14 in the desired orientation with the tube end 24. FIG. 1 illustrates the cutter/deflector plate 14 as most preferably being initially positioned and retained in direct abutting contact against the second tube end 24.

The cutter/deflector plate 14 is shown best in FIGS. 2 to 5 as being formed as a generally circular plate having a generally flattened disc-shaped profile. The cutter/deflector plate 14 is shown best in FIG. 2 as including a central hub 30, a circular support ring 32 and four cutting blades 34a,34b,34c, 34d. The support ring 32 extends concentrically about the hub 30 and has an inner diameter $D_i$ which is selected greater than the outer tube diameter $D_t$ (FIG. 1). Most preferably, the inner diameter $D_i$ of the support ring is selected at between about 0.5 to 15 mm, and more preferably about 10 cm greater than the outer diameter $D_t$ of the deformation tube 12.

It is to be appreciated that the hub 30 is dimensioned so as not to substantially interfere with the longitudinal movement of the cutter/deflector assembly, relative to the deformation tube 12. The hub 30 is provided with an axially disposed through bore 35 which is sized to receive the connecting cable 16 therein to facilitate position of the hub 30 and support ring 32 in concentric alignment with the tube axis $A_1$-$A_1$. The cutting blades 34a,34b,34c,34d extend radially from the bore 35 spanning between the hub 30 and the support ring 32. FIG. 2 illustrates best the cutting blades 34a,34b,34c,34d as extending radially outwardly, at equal 90° spaced orientations. As shown in FIG. 4, in a most preferred construction, the cutting blades 34a,34b,34c,34d are integrally formed with both the hub 30 and support ring 32, with the cutter/deflector plate 12 being formed as a single cast hardened steel unit.

Each of the cutting blades 34 is most preferably provided with a chamfered edge portion 38. The chamfered edge portion 38 of the blades 34a,34b,34c,34d are preferably flattened along their topmost edge to define a flattened cutting face 36. The cutting face 36 is positioned for concurrent engaging contact with the end 24 of the deformable tube sidewall 20 when the cutter/deflector assembly 14 is positioned in coaxially alignment therewith.

In use of the energy dissipation assembly 10, the cutter/deflector assembly 14 may be free floating relative to the moveable support 8, or may be directly secured thereto by weldments, mechanical fasteners or the like. Most preferably, the moveable support 8 is provided with either an aperture or pocket 44 (FIG. 1) which is sized to receive at least part of the deformable tube 12 therein.

On the occurrence of an impact or shock force on the moveable support 8 in an impact direction of arrow 100, the cutter/deflector assembly 14 is displaced together with the support 8 so as to move axially relative to the deformation tube 12, in a direction towards the fixed support 6. As the cutter/deflector assembly 14 moves, the cutting blades 34a, 34b,34c,34d engage and cut-through and deform the sidewall 20. As the sacrificial tube 12 is cut, the cutting and pettaling deformation of the deformation tube sidewall 20 advantageously acts to dissipate and/or absorb the shock force energy, limiting the transmission of impact forces therealong to the fixed support 6.

Reference may be had to FIG. 6 which illustrates schematically the installation of multiple energy dissipation assemblies 10a,10b in a light armoured vehicle (LAV) 50 in accordance with a prefer embodiment of the invention. The LAV 50 is shown having a double floor panel construction which includes an interior floor pan 52 which functions as a fixed support surface and an exterior floor pan 54, spaced therefrom, and which act as a moveable support to assist in absorbing explosive blast forces. In the configuration shown, the energy dissipation assemblies 10a,10b are positioned within the interior space 56 between the floor pans 52,54. The dissipation assemblies 10a,10b span across the space 56 with deformation tubes 12 secured to the interior floor pan 52 and the respective cutter/deflector assembly 14 engaged by the exterior pan 54.

As shown, the exterior floor pan 54 most preferably is provided with pockets 44 associated with the cutter/deflector plate 14 of each assembly 10a,10b. The pockets 44 are sized to at least partially receive therein part of the deformation tubes 12 as the associated tube sidewalls 20 are cut or petalled during the dissipation of impact forces.

The applicant has appreciated that providing an LAV 50 having the floor pan configuration shown advantageously may provide enhanced protection to the vehicle occupants against blast forces from improvised explosive devices (IEDs), land mines and the like.

Reference is made to FIG. 7 which illustrates a highway crash guardrail system 70 which incorporates multiple energy dissipation assemblies 10a,10b in accordance with an alternate embodiment of the invention. In the guardrail system 70 shown, a steel crash barrier 72 is secured by welding as a fixed support directly to the ends 22 of the deformation tubes 12 of the assemblies 10a,10b. In the configuration shown, each assembly 10a,10b is provided with a pair of stacked cutter/deflector plates 14a,14b. The cutter/deflector plates 10a,10b are secured to a steel I-beam barrier support 74 of the guardrail system in axial alignment with the second end 24 of each tube 12. It is to be appreciated that by stacking multiple cutters/deflector assemblies 14a,14b with radially offset blades in each assembly 10a,10b, it is possible to increase the amount of energy which may be absorbed and/or dissipated by each energy dissipation assembly 10, depending on the anticipated impact or shock force.

It is to be appreciated that while FIGS. 6 and 7 illustrate the use of the energy dissipation assembly 10 in vehicular and highway crash barrier applications, the invention is not so limited. Other possible applications for the dissipation assembly 10 could include without restrictions, as crash barriers used in building applications, such as at the bottom of elevator shafts to absorb and/or dissipate impact forces from runaway elevator cars and the like.

Figure 8:
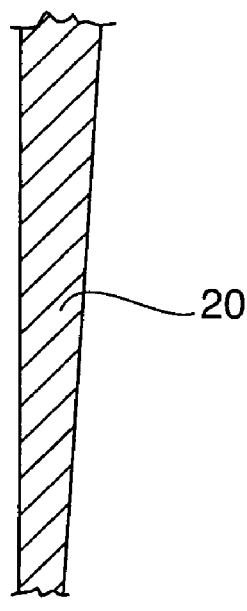
FIG. 8 shows a partial cross-sectional view of the sidewall of a deformation tube used in the energy dissipation assembly of FIG. 1 in accordance with a further embodiment of the invention.

Although FIG. 1 illustrates the sidewall 20 of the deformation tube 12 as having a constant thickness (t), the invention is not so limited. In an alternate construction, the deformation tube 12 could be provided with a sidewall 20 which tapers in thickness in the manner shown in FIG. 8, so as to either increase or decrease in thickness towards or away from the cutter/deflector assembly. In particular, by providing a deformation tube 12 with increasing thickness, it is possible to provide for the variable absorption rate of impact kinetic energy. The applicant has appreciated that by providing a sidewall 20 which decreases in thickness away from the cutter/deflector plate 14a, it is possible to compensate for anticipated damage/wear to the cutter/deflector assembly cutting blades 34, to facilitate the continued relative movement of the plate 14 longitudinally through the deformation tube 12. By increasing sidewall 20 which increases away from the cutter/deflector plate 14 it is possible to limit the amount of relative movement of the cutter/deflector plate 14 under threshold preselected kinetic forces.

Figure 9:
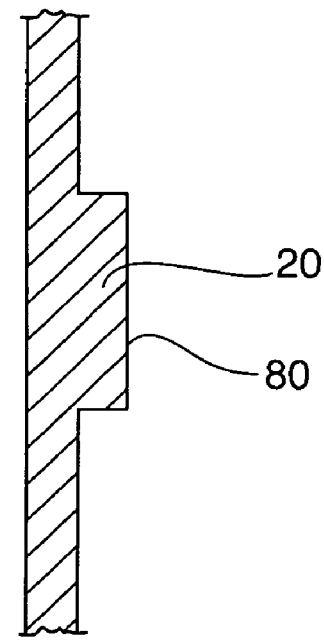
FIG. 9 shows a partial cross-sectional view of the sidewall of a deformation tube used in the energy dissipation assembly of FIG. 1 in accordance with a further embodiment of the invention.

In an alternate construction shown in FIG. 9, the deformation tube sidewall 20 of the deformation tube 12 may be provided with one or more sidewall portions 80 having enlarged diameter and thickness regions. It is envisioned that such enlarged portions 86 could advantageously be provided to compensate for secondary blast or impact forces, as for example, after initial yielding movement of the cutter/deflector plate 14 relative to the tube 12.

Experimental Results

In the development of the energy dissipation assembly 10, deformation studies were undertaken using a test cylindrical tube extrusion.

Figure 10:
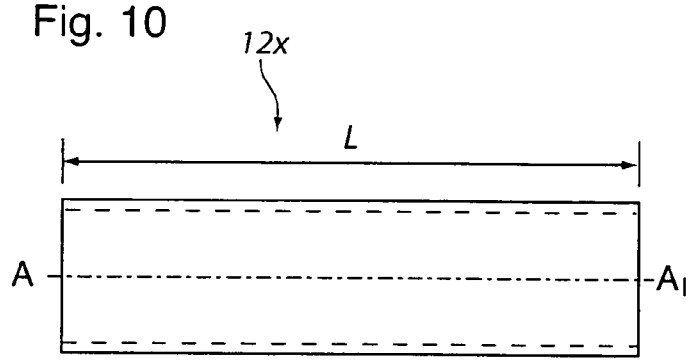
FIGS. 10 and 11 show schematically the geometry of a test cylindrical deformation tube for use with the energy dissipation assembly of FIG. 1 used in quasi-static and dynamic load testing.
Figure 11:
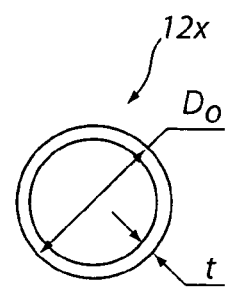

Reference is made to FIGS. 10 and 11 which illustrate respectively the side and end profiles showing the geometry of the sample aluminium tube extrusion 12x used in the validation of the dissipative energy properties of the present invention. In FIGS. 10 and 11, the sample tube or extrusion 12x is provided with a cross-section mean diameter $D_0$ of 50.8 mm, a wall thickness (t) 3.175 mm and sample length (L) of 300 mm. The applicant has appreciated that aluminium alloys are increasingly favoured in a variety of applications such as vehicle design and the like. The manufacturing flexibility of cast and extruded aluminium alloy members makes it possible to produce complex shaped primary structure members for a variety of applications which optimize vehicle weight distribution and overall performance. Moreover, aluminium offers good corrosion resistant and mechanical characteristics. Deformation tubes 12 formed as tubular aluminium extrusion have been found to be particularly suitable as they provide effective energy absorption capability through a wide range of plastic deformation modes in forms of progressive folding, bending, twisting, and splitting.

When the tube length (L) is greater than a critical length ($L_{cr}$), which identifies the transition between progressive folding and global bending, the extrusion tube 12x may tend to deform in the global bending mode. Global bending is generally less preferred as it provides a more inefficient mode of energy absorption, and therefor most preferably is to be avoided in crashworthiness applications. As such, the applicants have investigated the collapse modes of extrusion tubes 12x with a view to controlling the energy absorption characteristics is a big challenge.

Earlier investigated modes of deformation for circular aluminium tubes with D/t=4–63 and L/D=0.17–8.75 have been undertaken for both quasi-static and dynamic loading conditions.

It has been shown by the inventors' earlier investigation that the cutting deformation modes of AA6061-T6 and T4 extruded cylindrical tubes are stable and controllable under both dynamic and quasi-static loading conditions. A very minor initial high peak crush load can be configured under impact loading, thereby greatly reducing the initial high decelerations which are typically observed in the case of progressive folding or global bending deformation modes. The inventors have appreciated that this outcome may be significant when occupant safety is the greatest concern, as for example, in a vehicle crash or when an armoured vehicle is subjected to an explosive force. In this regard, dynamic and quasi-static axial cutting tests were conducted on cylindrical AA6061-T6 and T4 extrusions having varied wall thickness in the axial direction. Tests were carried out using a cutter and curved deflector to investigate the load/displacement responses and energy absorption characteristics. The focus of the experimental studies was on the controllability of the load/displacement responses of the extrusions with different tempers and loading conditions.

(i) Experimental Tests

Test Specimens and Material Properties

Experimental tests were undertaken using a cylindrical or circular cross-sectional AA6061-T6 and T4 temper cylindrical extrusions 12x having the geometry shown in FIGS. 10 and 11. The T6 temper specimens were directly cut from commercially available extrusions. The T4 temper specimens were obtained through a two-stage solution heat treating of AA6061-T6 extrusions, wherein T6 temper extrusions were placed in an oven at a temperature of 530° C. for one hour. After heating, the extrusion removed from the oven using steel tongs and immediately quenched in water at room temperature according to ASTM standard B918 [19].

Variations of the wall thickness of the tube 12x along the axial cutting direction (x direction), as illustrated in FIGS. 12a,12b and FIG. 13a-e, were simulated by material removal using a CNC lathe with minimal material removal in the final cut of the specimen. Various combinations of wall thickness change in the axial direction were considered to assess the influence and controllability of wall thickness on the load/displacement responses of the extrusion 12x. Care was further given when selecting the minimum wall thickness to avoid any switch to other undesired deformation modes, i.e., a local progressive folding mode. Localized length to diameter ratio and diameter to extrusion wall thickness was used to predict the possible crush deformation mode. If the progressive folding mode was predicted, estimation of the mean crush force for extrusions with varied wall thicknesses was completed using analytical modes for either the axisymmetric or non-symmetric mode. Typically, the crush force needed to initiate the progressive folding deformation mode is much greater than the mean crush force. It was observed that the ratio of peak crush force and the mean crush force was determined to be 2.48 and 1.42 for the T6 and T4 temper extrusions, respectively. Thus, for design safety, it is preferable to select a lower peak crush force than the predicted peak crush force for the T6 and T4 temper material which would possibly trigger progressive folding mode. A similar value for the peak force is necessary to trigger the global bending mode. Therefore, in order to avoid any undesired switch to other deformations during the cutting process, the cutting force is preferably less than the force necessary to trigger those deformation modes.

Figure 14:
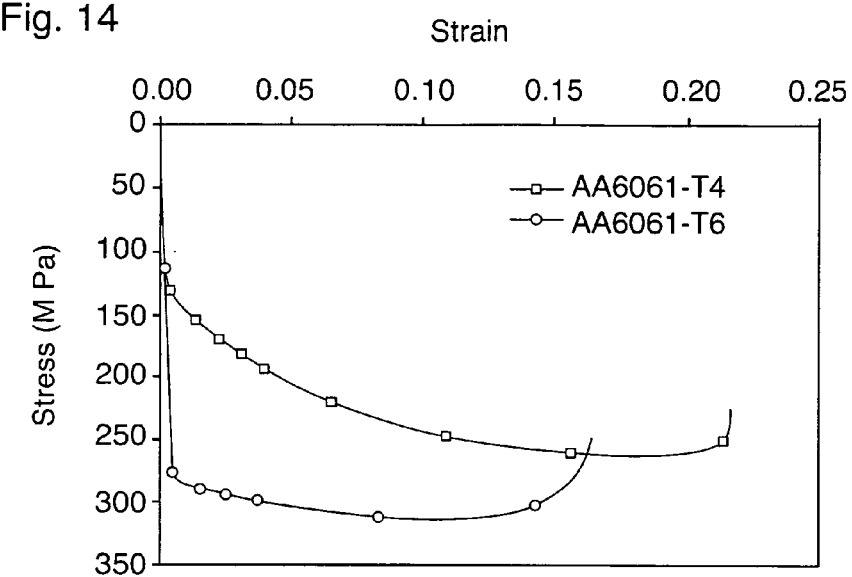
FIG. 14 illustrates graphically engineering stress-strain curves of AA6061-T6 and AA6061-T4 testing materials.

Material properties of AA6061-T6 and T4 extrusions were determined by averaging eight tensile tests. The obtained engineering stress-strain curves of a representative T6 and T4 temper tensile specimens are illustrated in FIG. 14. The two materials have significant differences in the yield point and hardening properties. The T6 temper illustrated a minimal level of strain hardening, while the T4 temper illustrated a greater amount of strain hardening. The material properties of the AA6061-T6 and T4 are averaged over the eight tensile specimens and summarized in Table 1, where the yield strength is the 0.2% proof stress.

TABLE 1

Material properties of the AA6061-T6 and T4 from tensile tests [16]

| Properties | AA6061-T6 | AA6061-T4 |
| --- | --- | --- |
| E (GPa) | 68.1 | 65.3 |
| $\sigma_y$ (MPa) | 277.5 | 116.2 |
| $\sigma_u$ (MPa) | 320.2 | 258.3 |

Cutters and Deflectors

A cutter or a combination of cutter and curved profile deflector was used to generate a cutting deformation within the extrusions. The cutter and the curved deflector are consistent with those used in previous research by the applicant. The cutter was machined from AISI 4140 round bar stock followed by a two-stage heat treatment process. The hardness of the cutters after heat treatment was determined to be no less than HRC 53 thus ensuring cutting deformation within the AA6061-T6 and T4 extrusions without deformation or failure of the cutter blades.

Experimental Test

Figure 12A:
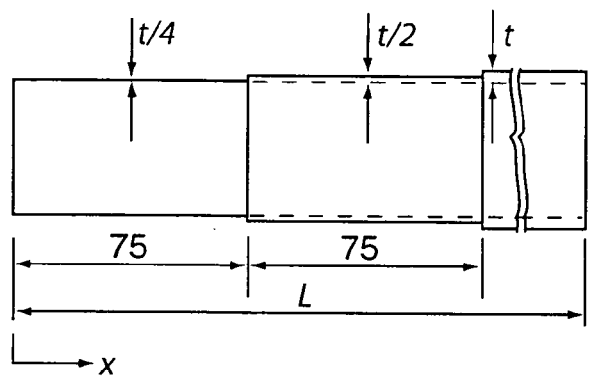
FIGS. 12a and 12b show schematically sample geometries of a test deformation tube used in the dynamic and quasi-static testing.
Figure 12B:
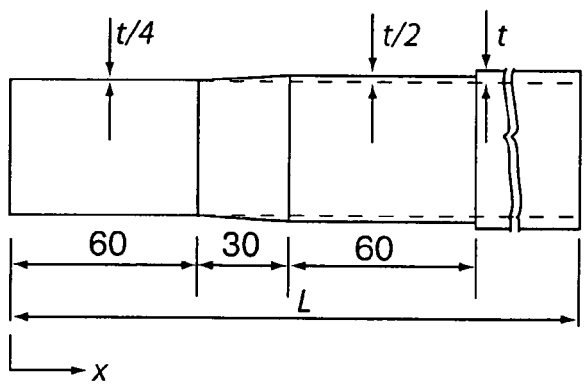
Figure 13A:
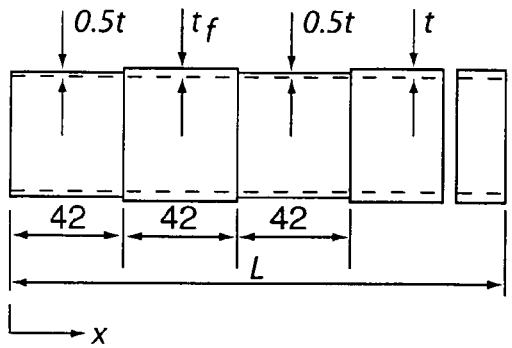
FIGS. 13a to 13e show schematically test deformation tube geometries used in quasi-static cutting testing.
Figure 13B:
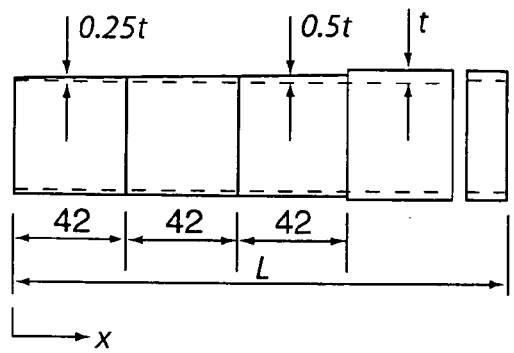
Figure 13C:
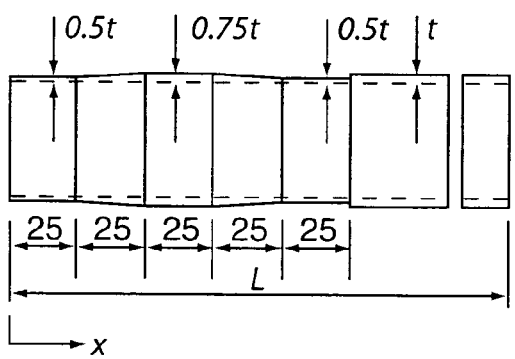
Figure 13D:
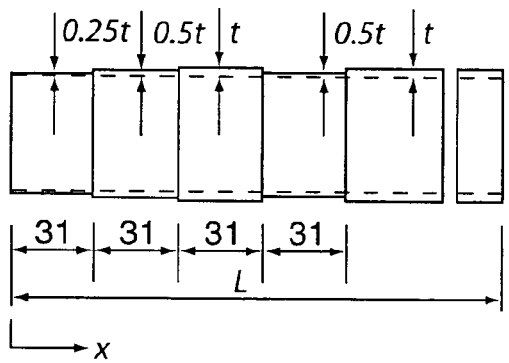
Figure 13E:
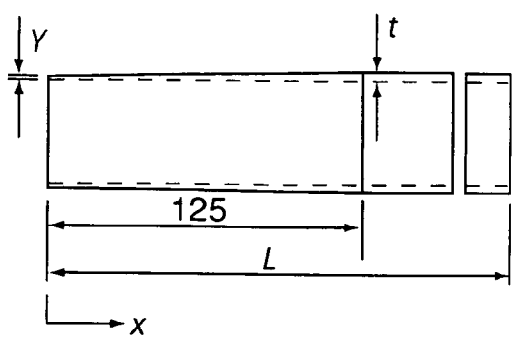

Two tests were completed for each temper extrusion of the same geometry as shown in FIGS. 12a,12b and FIGS. 13a-13e in order to investigate the controllability of the load/displacement responses and energy absorption characteristics. Tubular extrusions with geometries as illustrated in FIGS. 10 and 11 were cut by a cutter/deflector assembly under both dynamic and quasi-static loading conditions. Since the deflector had a very minor influence on the load/displacement response, quasi-static cutting tests using the cutter only were carried out on both temper extrusions with geometries as shown in FIGS. 13c to 13e to further study the controllability of load/displacement profiles. The specimens tested dynamically and quasi-statically are listed in Table 2 and Table 3, respectively.

TABLE 2

Cutting measures for extrusions under dynamic cutting tests

| Specimen | Tube geometry | $P_m$ (kN) | TEA (kJ) | SEA (kJ/kg) | With Deflector |
| --- | --- | --- | --- | --- | --- |
| T6_a_D | FIG. 12a | 10.61 | 1.40 | 4.50 | Yes |
| T4_a_D | FIG. 12a | 9.67 | 1.40 | 4.50 | Yes |
| T6_b_D | FIG. 12b | 10.70 | 1.47 | 4.75 | Yes |
| T4_b_D | FIG. 12b | 10.07 | 1.49 | 4.81 | Yes |

TABLE 3

Cutting measures for extrusions under quasi-static cutting tests

| Specimen | Tube geometry | $P_m$ (kN) | TEA (kJ) | SEA (kJ/kg) | With Deflector |
| --- | --- | --- | --- | --- | --- |
| T6_a_S | FIG. 12a | 11.52 | 1.64 | 5.29 | Yes |
| T4_a_S | FIG. 12a | 9.56 | 1.37 | 4.43 | Yes |
| T6_b_S | FIG. 12b | 10.95 | 1.57 | 5.05 | Yes |
| T4_b_S | FIG. 12b | 9.17 | 1.31 | 4.22 | Yes |
| T6_c_S | FIG. 13a ($t_f$ = t) | 25.88 | 3.75 | 11.40 | No |
| T4_c_S | FIG. 13a ($t_f$ = 0.75t) | 18.26 | 2.60 | 7.91 | No |
| T6_d_S | FIG. 13b | 15.06 | 2.17 | 7.72 | No |
| T4_d_S | FIG. 13b | 10.62 | 1.52 | 5.41 | No |
| T6_e_S | FIG. 13c | 25.47 | 3.71 | 11.66 | No |
| T4_e_S | FIG. 13c | 19.09 | 2.76 | 8.66 | No |
| T6_f_S | FIG. 13d | 23.19 | 3.39 | 10.82 | No |
| T4_f_S | FIG. 13e | 16.67 | 2.44 | 7.78 | No |
| T6_g1_S | FIG. 13e (Y = 0.25t) | 29.90 | 4.31 | 13.36 | No |
| T4_g1_S | FIG. 13e (Y = 0.25t) | 22.29 | 3.20 | 9.93 | No |
| T6_g2_S | FIG. 13e (Y = 0.5t) | 33.94 | 4.88 | 14.22 | No |
| T4_g2_S | FIG. 13e (Y = 0.5t) | 27.21 | 3.95 | 11.52 | No |
| T6_g3_S | FIG. 13e (Y = 0.75t) | 39.72 | 5.85 | 16.09 | No |
| T4_g3_S | FIG. 13e (Y = 0.75t) | 28.76 | 4.16 | 11.44 | No |
| T6_g4_S | FIG. 13e (Y = t) | 41.6 | 5.9 | 15.3 | No |
| T4_g4_S | FIG. 13e (Y = t) | 30.29 | 4.36 | 11.34 | No |

The identification system of the cutting tests follows the convention $\alpha\_\beta\_\gamma$, where '$\alpha$' indicates the specimen temper condition; '$\beta$' represents the geometric profile of the specimen; and '$\gamma$' indicates the cutting test loading condition (D for dynamic and S for quasi-static).

Dynamic Cutting Test

Figure 15A:
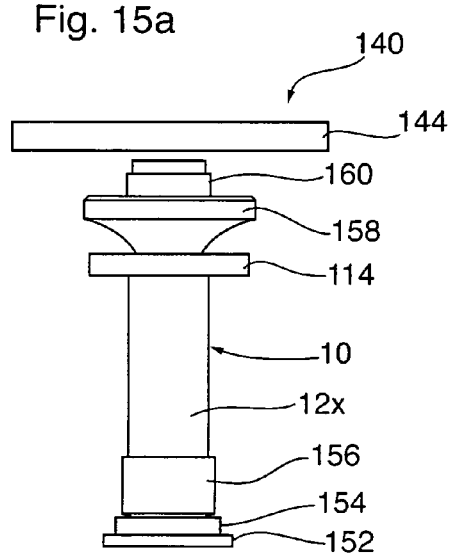
FIGS. 15a and 15b illustrate schematically the test setup of the kinetic energy dissipation assembly used in dynamic cutting testing (FIG. 15a) and quasi-static testing (FIG. 15b)

Dynamic axial cutting of the T6 and T4 temper extrusions was performed using a custom built droptower system 140. A schematic diagram of the dynamic cutting test setup is shown in FIG. 15a. The droptower system 140 consisted of a pneumatic accelerator (not shown), a dropping entity with a mass of 53.7 kg, and a support device. The dropping entity which is comprised of steel mass blocks and a 25.4 mm thick AA6061-T6 impact plate 144 moveable along two guide posts. A desktop computer with custom-developed software was used to control the height of the dropping entity. The support device included a three-jaw chuck by which a hardened AISI 4140 flat disc 152 was clamped. The flat disc 152, a piezoelectric impact load cell 154 (referred to as the lower load cell), and a hardened AISI 4140 support cup 156 were fastened together using standard ¼ inch fasteners. The lower load cell 154 (model # 200C20) had a capacity of 89 kN and was used to measure the impact cutting force. The support cup 156 had an inside diameter of approximately 0.5 mm greater than the outer diameter of the specimens in order to ensure an appropriate hold of the extrusion during testing.

A prototype cutter deflector assembly 10 and the deflector 158 were fastened together using a standard ¼ inch fastener and manually placed at the top end of a test deformable cylindrical specimen or extrusion 12x with careful alignment to ensure that the centre of the cutter was coaxially aligned with the axial centreline of the cylindrical tube 12x. Prior to inserting the test extrusion 12x into the support cup 156, a pre-cut of the extrusion was made at a nearby loading frame using a hydraulic jack by pushing the cutter/deflector assembly 114 into the extrusion approximately 1 mm. This process was completed to avoid shifting or mis-alignment between the centerlines of the extrusion 12x and the cutter/deflector assembly 114 as a result of a slight shaking of the droptower system during the impact process. A second piezoelectric impact load cell (referred to as the upper load cell 160) was fastened to the top end of the deflector to measure the impact force between the impact plate 144 and the deflector 158. This load cell 160 (model # 200C50) had a capacity of 222 kN.

The mass of the steel support cup 156 was 0.42 kg and both load cells 154,160 had a mass of approximately 0.43 kg. The mass of the cutter 114 and the curved deflector 158 was 0.71 kg and 2.18 kg, respectively.

After the pre-cut of the extrusion 12x was completed the specimen kinetic energy diffusion assembly, consisting of the deformable tubular extrusion 12x, cutter/deflector assembly 114, and the upper load cell 160, was freely placed into the support cup 154.

Displacement of the impact plate 144 during the cutting process was measured using a micro-epsilon non-contact laser displacement transducer (model # optoNCDT 1607-200) with a range of 200 mm. Analog voltage output from the laser displacement transducer was measured using a National Instruments NI9215™ (4 channel, 16 bit, analog input module) and incorporated into a National Instruments CompactDAQ™ data acquisition system. The NI9215 had a capacity of simultaneously measuring at 100 kHz/channel. Output from the piezoelectric load cells 154,160 was measured using a National Instruments NI9233™ module which incorporated integrated electronic piezoelectric (IEPE) signal conditioning. The NI9233 had a capacity of simultaneously measuring at 50 kHz/channel. A laptop computer equipped with National Instruments LabVIEWSignalExpress™ data acquisition software was used to record the measurements of the laser displacement transducer and the two load cells 154,160 through the NI9215 and NI9233 modules. A consistent data sampling rate of 50 kHz was used for all impact tests. All testing was completed at room temperature.

Prior to impact testing, the dropping entity was raised to the maximum height of approximately 1514±20 mm and a pneumatic accelerator was pressurized to approximately 649.5 kPa. The combination of the pneumatic pressure and dropping height resulted in an approximate impact velocity of 7.0 m/s. Just prior to impact cutting, the data acquisition system commenced sampling of the signals from the laser displacement transducer and the two piezoelectric load cells 154,160. Acquisition of the testing data was stopped following completion of the cutting test.

Quasi-Static Cutting Test

Figure 15B:
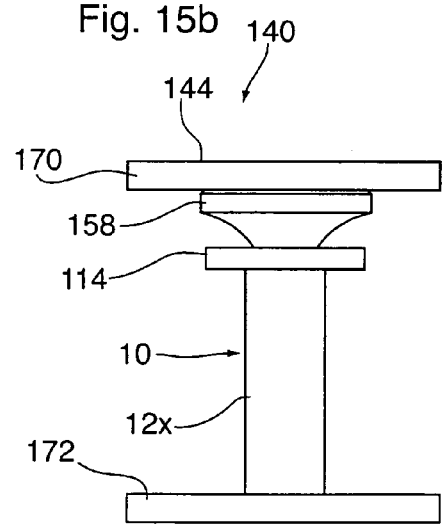

Quasi-static axial cutting tests were performed using a hydraulic Tinius Olsen™ compression testing machine. A schematic diagram of the quasi-static cutting test setup is shown in FIG. 15b. The specimen extrusion 12x was placed at the centre of the testing machine's platen between stationary plate 170 and crush plate 172 with its longitudinal axis parallel to the direction of cutting. The cutter 114 and the deflector 158 were fastened together using a standard ¼ inch fastener and manually placed at the top of the extrusion specimen 12x with careful alignment. For the cutting tests without the presence of a deflector, a round AISI 4140 steel rod with a diameter of 25.4 mm and a length of 250 mm was placed on top of the cutter instead in order to push the cutter into the specimen.

The load cell used to determine the axial cutting force had a range of 150 kN. The platen displacement was measured using a linear voltage differential transformer (LVDT) with a range of 150 mm. The laptop computer and the voltage measurement module NI 9215 were used to record the measurements of the displacement and quasi-static cutting force.

A data sampling rate of 1.6 KHz was used for all quasi-static tests. The specimens 12x were cut at a platen speed of approximately 2.2 mm/s at room temperature. The cutting process was terminated after a platen displacement of approximately 145 mm.

Experimental Test Results and Comparisons

Dynamic and quasi-static cutting tests were carried out with a single cutter/deflector assembly 114. For all cutting tests, the cutter blades penetrated into each of the cylindrical extrusions and chips were formed. No crack propagation was observed for any test. To evaluate the energy absorption behaviour and load/displacement characteristics of different extrusions 12x with different configurations and loading conditions, the mean crush force ($P_m$), total energy absorption (TEA), and specific energy absorption (SEA) were calculated.

Figure 16:
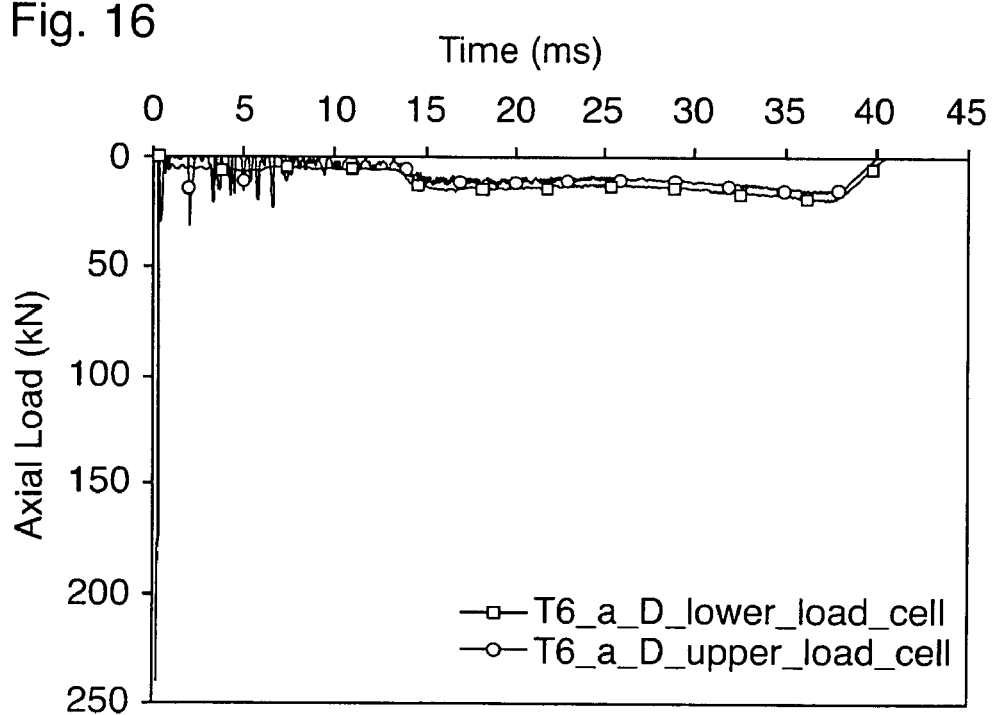
FIG. 16 illustrates graphically Load/time profiles from the upper and lower load cells for a test T6 temperature extrusion having geometry of FIG. 12a using a single cutter/deflector under dynamic loading.

The dynamic cutting tests typically lasted 28-42 ms, depending on the configurations. FIG. 16 shows the load/time profiles recorded from the upper and the lower load cell for a representative T6 specimen have the geometry shown in FIG. 12a when cut by a single cutter/deflector plate or assembly 114. Similar observations were found for other different configurations. FIG. 16 shows a delay of approximately 0.1 ms between the instance when the recorded forces in the lower load cell 154 and the upper load cell 160 increased above zero. This time is in agreement to the time needed for the impacting stress wave to travel from the top to the bottom of the extrusions. The forces recorded from the upper load cell 160 were much greater than those from the lower load cell 154 at the beginning of the dynamic cutting process. This load difference is due to the nature of the events which are occurring at the upper and lower load cells 154,160. An impact event is occurring in between the dropping entity and the upper load cell 160 while support of the extrusion 12x and cutter/deflector assembly 114 is occurring at the lower load cell 154. Conducting an impact analysis between the dropping entity and the cutter/deflector assembly 114 justifies the observed high impact forces of approximately 250 kN. Moreover, the upper load cell 160 recorded zero force at certain intervals, which was due to intermittent contact between the upper load cell 160 and the dropping entity.

The recorded load from the upper load cell 160 for all tests was observed to be approximately 4 kN lower than that from the lower load cell 154 at the steady state cutting stage, which was due to the deceleration of the cutter/deflector assembly 114 and the dropping entity at the steady state cutting stage. This deceleration was estimated to be approximately 7.2 g.

Although two tests were completed for each configuration, fairly consistent load/displacement profiles were observed. Furthermore, the investigation focus was to investigate the controllability of load/displacement responses of the extrusions under dynamic and quasi-static axial cutting loads through the alteration of the tubular extrusion wall thickness. The calculated crashworthiness measures for each configuration tested dynamically and quasi-statically were averaged as presented in Tables 2 and 3, respectively.

Dynamic Cutting Test Results with a Cutter and Deflector Assembly

Figure 17A:
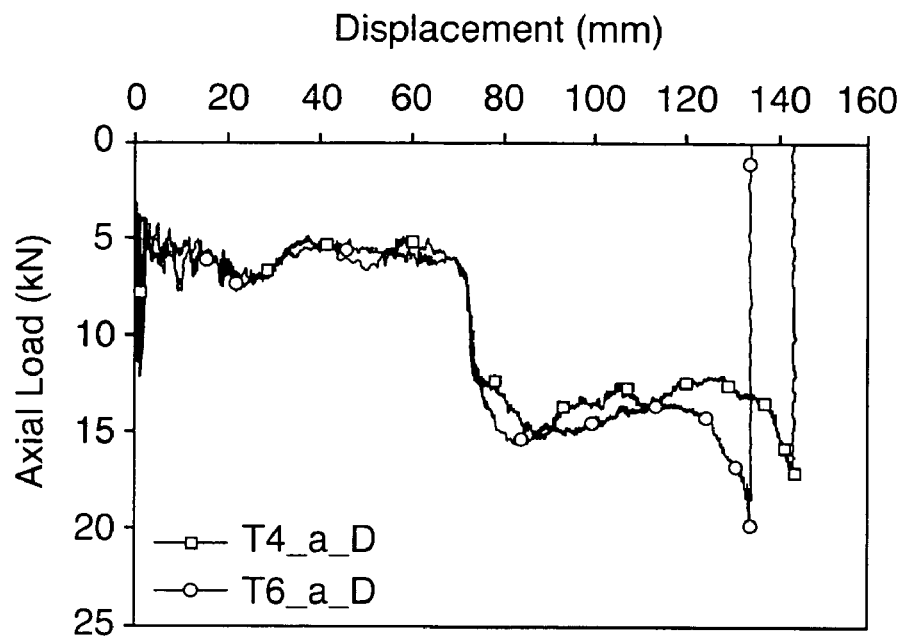
FIGS. 17a and 17b illustrate Load/displacement profiles for test T6 and T4 extrusions having the geometries shown in FIG. 12a and FIG. 12b using a single cutter/deflector under dynamic loading.
Figure 17B:
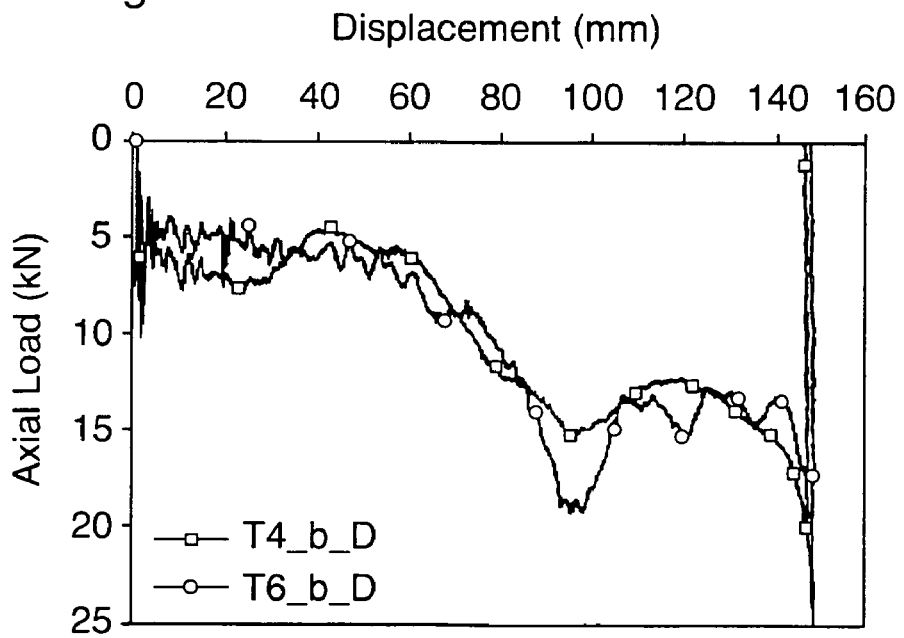

The load/displacement responses for T6 and T4 temper tubular extrusions 12x having geometries shown in FIGS. 10 and 11 when dynamically cut by a cutter/deflector assembly 14 are shown in FIGS. 17a and 17b, respectively. It can be seen from FIGS. 17a and 17b that the dynamic cutting force exhibited a higher peak load at the initial transient cutting stage. Then the cutting force slightly oscillated and reached the first steady state cutting stage. With the progress of the cutting process, the petalled sidewalls interacted with the deflector 158 (at a displacement of approximately 25-30 mm) resulting in a slight drop of the cutting force. Then the cutting force reached its second steady state cutting stage after a displacement of approximately 30-35 mm. After that, for extrusions 12x with geometry as shown in FIG. 12a, the cutting force started to climb at a displacement of approximately 72 mm and reached its third steady state cutting stage at an approximate displacement of 85 mm. For tubular extrusions 12 with geometry as shown in FIG. 13, the cutting force started to ramp at a displacement of approximately 58 mm and reached a third steady state cutting stage at an approximate displacement of 95 mm. The occurrence of the cutting force climbing or ramping, before reaching the third steady state cutting stage, was observed to be approximately 2-3 mm ahead of the extrusion wall thickness change, which is mostly due to the intermittent contact between the upper load cell 160 and the dropping entity mass (displacement is measured on the drop mass). Vibration of the droptower may also contribute to the error of displacement measurement. Generally, the load/displacement responses followed the variation of the wall thicknesses of the tubular extrusion 12x.

For both geometries of tubular extrusion 12x after the third steady state stage had been reached, the cutting force oscillated slightly due to localized material fracture that occurred on the petalled sidewalls after interacting with the deflector. Material fractures appeared with greater frequency and significance on the T6 temper extrusions 12x than that on the T4 temper extrusions 12x, an occurrence which was due to the greater hardening property of the T4 temper material. The final surge of the cutting 114 force in some cases was due to the shifting of the cutter, resulting contact between the extrusion sidewalls and the cutter outer rim or inner hub.

At the second steady state cutting stage, the steady state cutting force was observed to be approximately 6.5 kN and 5.5 kN for T6 and T4 temper extrusions 12x with wall thickness of 0.25t, respectively. At the third steady state cutting stage, the steady state cutting force was observed to be approximately 13.5 kN and 12.5 kN for T6 and T4 temper extrusions 12x with wall thickness of 0.5t, respectively. The third steady state cutting force was observed to be slightly more than double that of the second steady state cutting force for same temper extrusions 12x, while the wall thickness was exactly twice as large at the third steady state cutting stage compared to the second steady state cutting stage. This difference is mostly due to the occurrence of localized material fractures at the third steady state cutting stage.

The averaged mean cutting forces for the T6 temper tubular extrusions 12x having the geometries shown in FIGS. 12 and 13 were determined to be 10.61 kN and 10.70 kN, respectively. The averaged mean cutting forces for the T4 temper extrusions 12x having the geometries as illustrated in FIGS. 12 and 13 were determined to be 9.67 kN and 10.07 kN, respectively. Though the drop entity height and the pneumatic assist setup were the same for all dynamic testing, the TEA was different depending on the total travelling distance of the dropping entity 44. As shown in Table 2 and FIGS. 17a and 17b that typically the T6 temper extrusion 12 had a larger mean cutting force and less total displacement than the T4 temper extrusion 12. Thus the TEA was observed to be consistent for both temper extrusions, as was the SEA.

Quasi-Static Cutting Test Results with a Cutter and Deflector Assembly

Figure 18A:
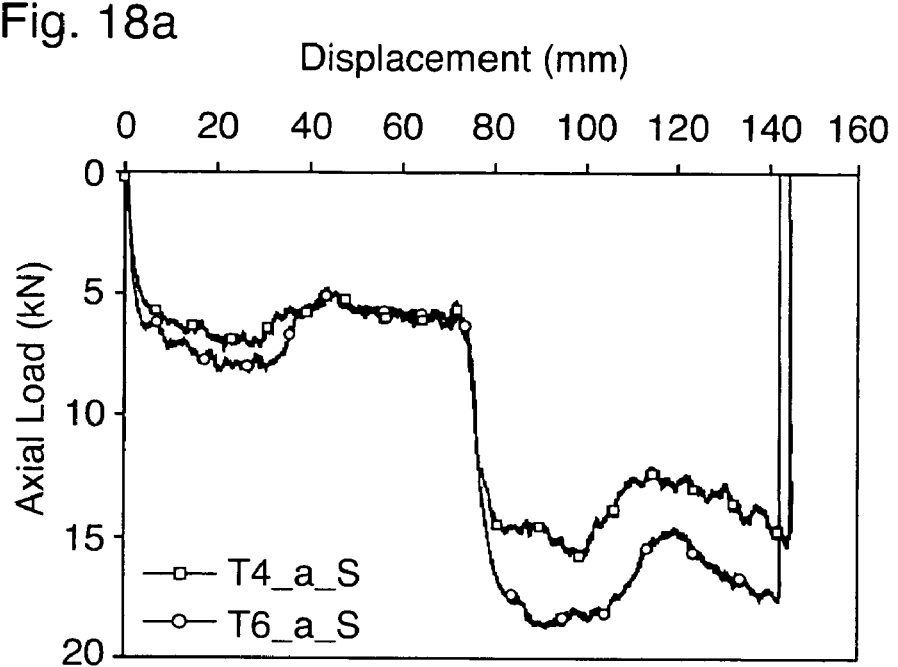
FIGS. 18a and 18b illustrate Load/displacement profiles for test T6 and T4 extrusions having deformation tube profiles shown in FIGS. 12a and 12b and FIG. 2b using a single cutter/deflector under quasi-static loading.
Figure 18B:
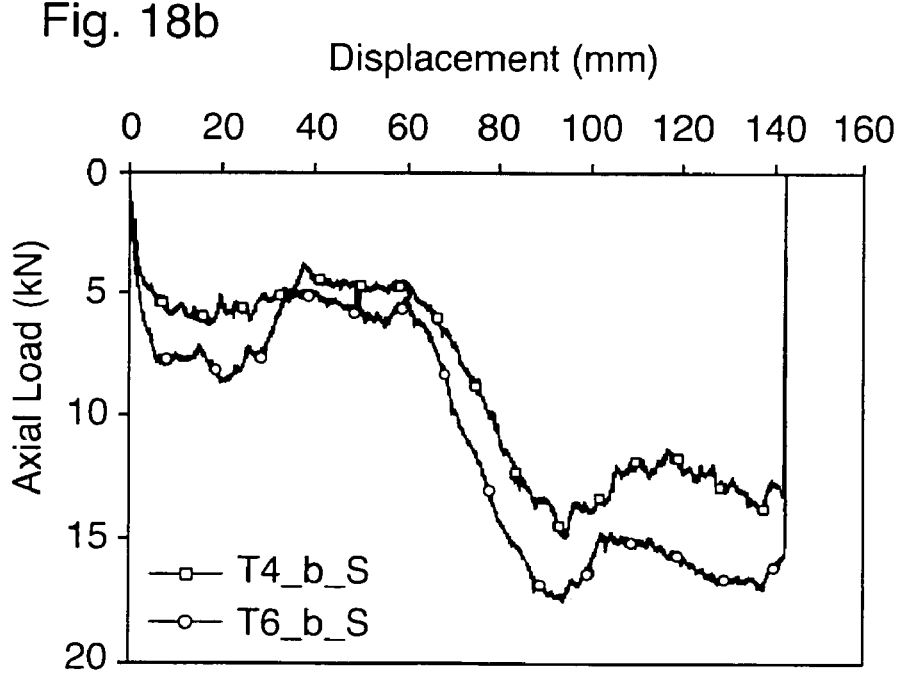
Figure 19A:
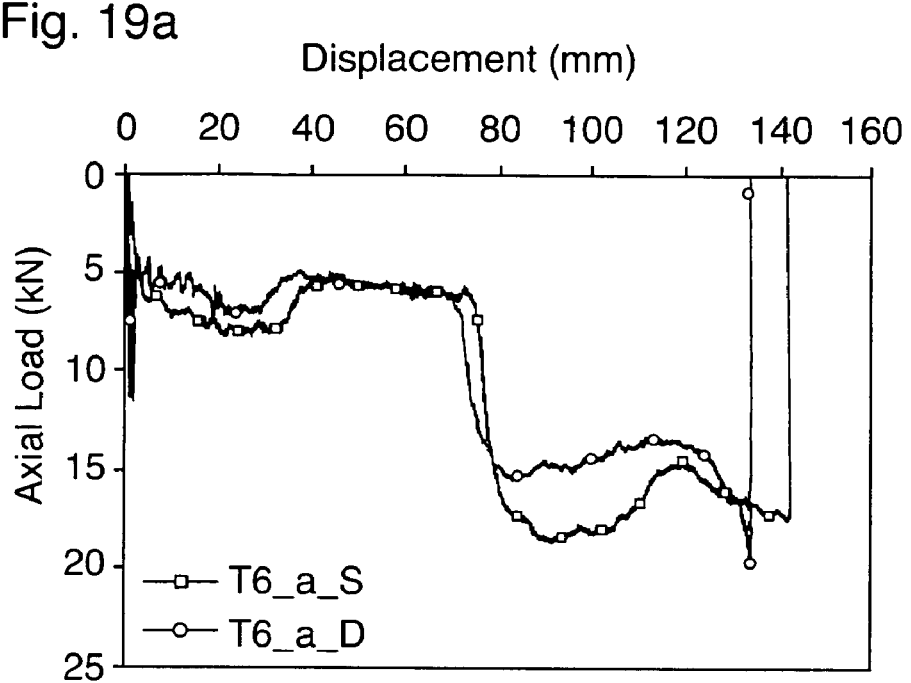
FIGS. 19a and 19b illustrate graphically Load/displacement profiles for test T6 and T4 deformation tube extrusions, having the geometry shown in FIG. 12a when cut by a single cutter/deflector under dynamic loading (FIG. 19a) and quasi-static loading (FIG. 19b)
Figure 19B:
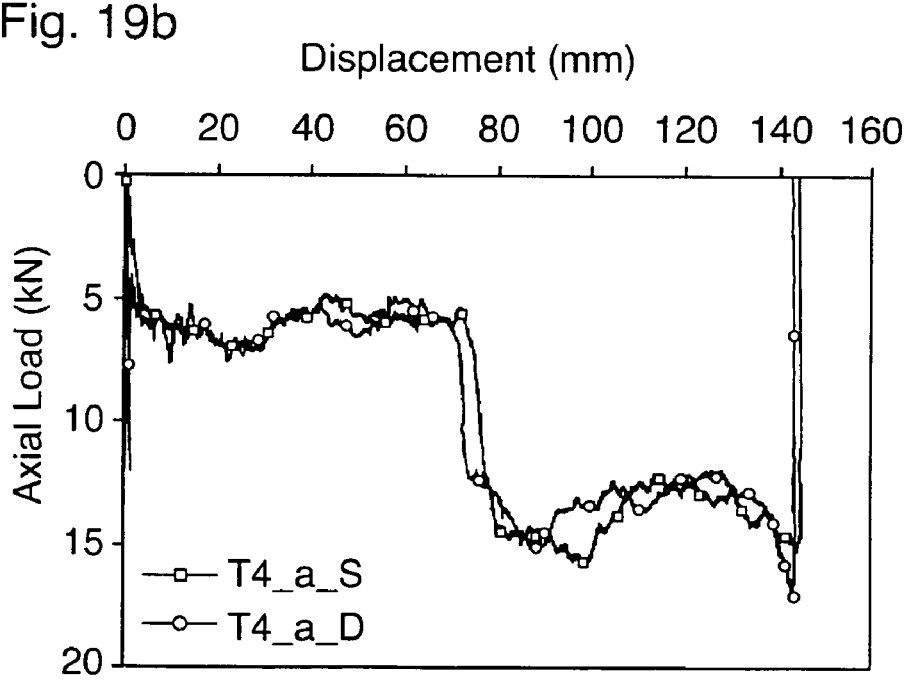
Figure 20A:
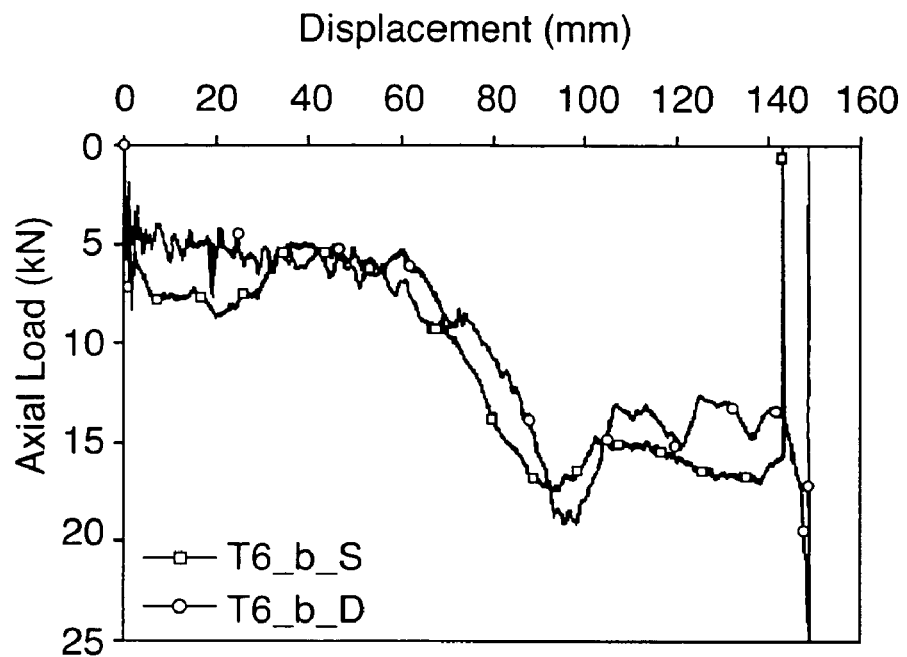
FIGS. 20a and 20b illustrate graphically Load/displacement profiles for test T6 and T4 deformation tubes having the geometry shown in FIG. 12(b) using a single cutter/deflector under dynamic loading (FIG. 20a) and quasi-static loading (FIG. 20b)
Figure 20B:
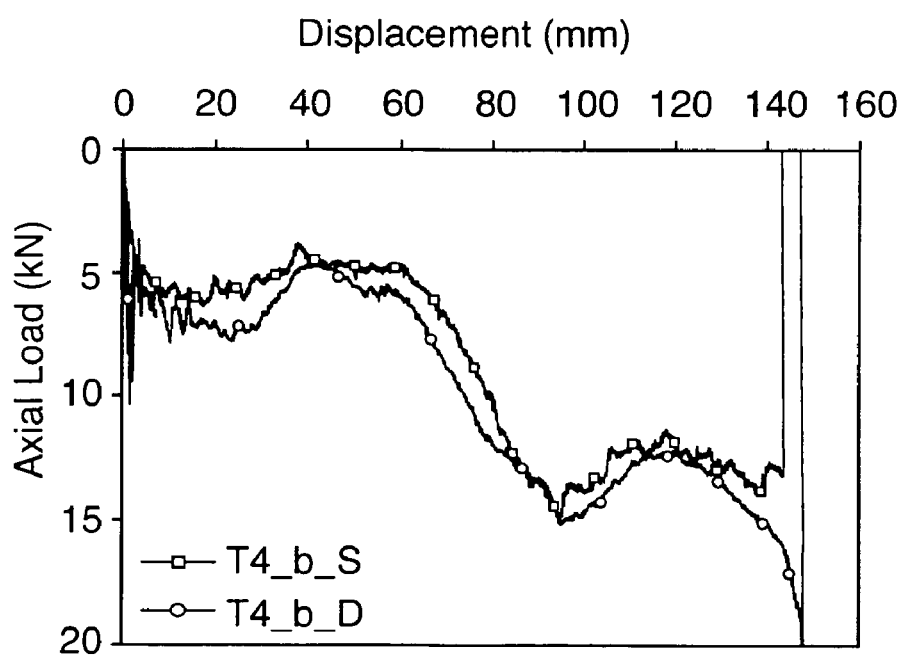

FIGS. 18a and 18b illustrate the load/displacement profiles for T6 and T4 temper extrusions 12x having the geometries as shown in FIGS. 12 and 13 quasi-statically cut by a cutter/deflector assembly 14, respectively.

Material fractures were also observed in some tests, most typically on the T6 temper extrusions 12x that resulted in the fluctuation of the load/displacement curves. The material fractures observed here were much less extensive compared to that observed in the dynamic testing. The cutting load was observed to increase and reached its first steady state stage after an approximately 8 mm displacement. With the progress of the cutting process, the cutting load increased when the petalled tube walls made contact with the deflector 158 at approximately 30 mm displacement. Then, with the outward flaring of the petalled tube sidewalls, the cutting load dropped to some extent and reached the second steady state cutting stage after a displacement of approximately 35-42 mm. After that, for extrusions 12x having the geometry shown in FIG. 12, the cutting force started to climb at a displacement of approximately 75 mm and reached its third steady state cutting stage. For extrusions 12x with geometry shown in FIG. 12b, the cutting force started to ram at a displacement of approximately 60 mm, and then reached its third steady state cutting stage at a displacement of approximately 90 mm. The occurrence of the cutting force climbing or ramping was observed to generally match the variation of the extrusions wall's thickness. For both geometries of extrusion after the third steady state stage had been reached, the cutting force oscillated slightly due to localized material fracture that occurred on the petalled sidewalls after interacting with the deflector 158.

At the second steady state cutting stage, the steady state cutting force was observed to be approximately 7 kN and 6 kN for T6 and T4 temper extrusions 12x with wall thickness of 0.251, respectively. At the third steady state cutting stage, the steady state cutting force was observed to be approximately 16.5 kN and 13 kN for T6 and T4 temper extrusions 12x with wall thickness of 0.5t, respectively. Similar to the dynamic loading condition, the third steady state cutting force was observed to be slightly more than twice as large as the second steady state cutting force for same temper extrusions 12x while the wall thickness was exactly twice as large at the third steady state cutting stage compared to the second steady state cutting stage.

Table 3 shows that the averaged $P_m$ for both T6 and T4 temper extrusions 12x having the geometry of FIG. 13 was calculated to be 11.52 kN and 9.56 kN, respectively. The averaged $P_m$ for both T6 and T4 temper tubular extrusions 12 with geometry as shown in FIG. 12b was calculated to be 10.95 kN and 9.17 kN, respectively. The T6 temper extrusion 12x had a larger value of $P_m$ compared to the T4 temper extrusion 12x of the same geometry, which is due to the larger yield strength associated with the T6 temper material. The total displacement for the T6 and T4 temper extrusions 12x under quasi-static loading was approximately the same. Thus, the TEA and SEA of the T6 temper extrusion 12x was observed to be larger than that for the T4 temper extrusion 12x with the same geometry, as listed in Table 3.

Comparisons Between Dynamic and Quasi-Static Cutting Test Results

Representative load/displacement profile comparisons between dynamic and quasi-static cutting tests for T6 and T4 temper extrusions 12x having the geometries of FIGS. 12 and 13 cut by a cutter/deflector assembly 114 are presented in FIGS. 19a,19b to 20a,20b, respectively. As can be seen, the main difference is related to the initial part of the impact cutting test where the dynamic force was approximately 1.08-1.74 times higher than that under the quasi-static cutting test. "McGregor et al. Impact performance of aluminium structures', In: Structural crashworthiness and failure (Jones, N. and Wierzbicki, T., editors), Elsevier, 1993, 385-42, the disclosure of which is incorporated herein by reference, found that the strain rate effect of aluminium was negligible in the range of tested velocity (7-9 m/s). Further, Maiden and Green 'Compressive strain-rate tests on six selected materials at strain rates from $10^{-3}$ to $10^4$ in/in/sec', Journal of Applied Mechanics, 1966 v33 496-504, the disclosure of which is incorporated herein by reference, reported that AA6061-T6 showed little or no rate effects for strain rates up to approximately 1000 $s^{-1}$. Thus, as strain-rate effects are assumed to be of minor importance for AA6061-T6 and T4 materials. The observed difference is therefore attributed to either stress wave propagation, which is only significant when displacements are close to zero, and/or to inertia effects that develop at the instant of impact in order to initiate the cutting process. The displacement needed to reach the first steady-state cutting process under impact was observed to be slightly less than that needed for the quasi-static tests. After this initial cutting process, the dynamic cutting forces for the T6 temper extrusions 12x were typically lower than the quasi-static cutting forces, while the dynamic cutting forces for the T4 temper extrusions 12x were slightly higher than the quasi-static cutting forces. Since the T6 temper is strain-rate insensitive and has the lowest degree of material hardening characteristics, the measured dynamic cutting force was slightly lower than the quasi-static cutting force due to the lower value of the coefficient of friction between the cutter blades and the sidewalls under dynamic loading. For the T4 temper extrusion 12x, the measured dynamic cutting force was slightly larger than the quasi-static cutting force which is a combination of the coefficient of friction and the work hardening property of T4 temper material.

Dynamic cutting forces were generally consistent with the observed quasi-static loads during the majority of the displacement, especially for the T4 temper extrusion 12x. At the third steady state cutting stage, the dynamic cutting force fluctuated significantly for the T6 temper extrusion due to the occurrence of material fracture, generally away from the cutting zone. Force oscillation for the T4 temper extrusions 12x at this stage was observed due to minor material fracture occurring under both loading conditions.

The ratio of dynamic to quasi-static values of $P_m$ was observed to be 0.92 and 1.09 for extrusions 12x with geometries as shown in FIGS. 10 and 11 under single stage cutting processes, which show the strain rate insensitivity property of AA6061 material again.

For both tempered extrusions under dynamic and quasi-static loading conditions, the cutting load responses generally agreed with the variation of the extrusion wall thickness. The cutting forces were slightly more than doubled when the wall thickness was doubled from 0.25t to 0.5t under both loading conditions. Moreover, the implementation of the deflector 158 seemed to have a minor influence on the relation between the cutting force and the extrusion 12x instantaneous wall thickness (there was a slight drop of the cutting force due to the interaction between the petalled extrusion side walls and the deflector).

Cutting Test Results without a Deflector

Figure 21A:
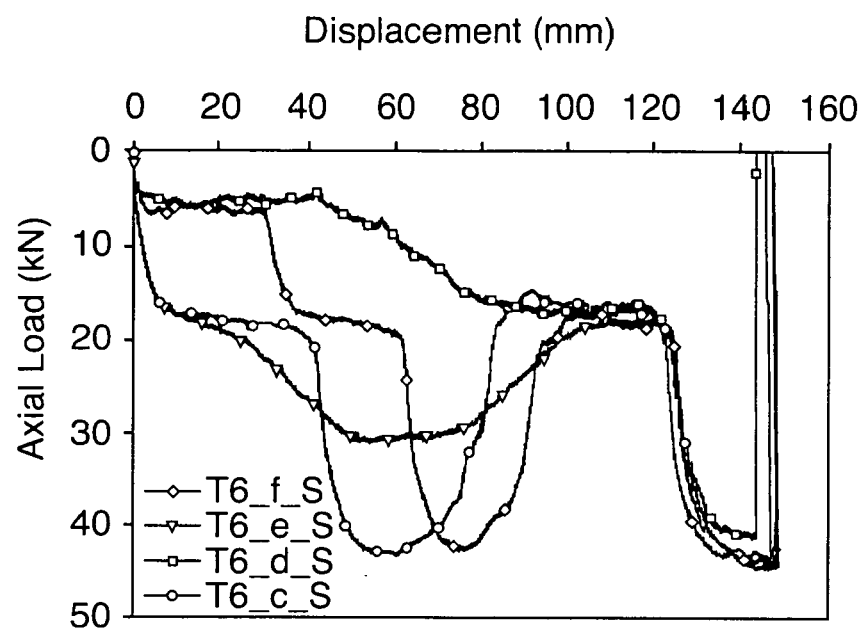
FIGS. 21a and 21b illustrate graphically Load/displacement profiles for test T6 and T4 deformation tubes having the geometry shown in FIGS. 13a to 13e using a single cutter under quasi-static loading.
Figure 21B:
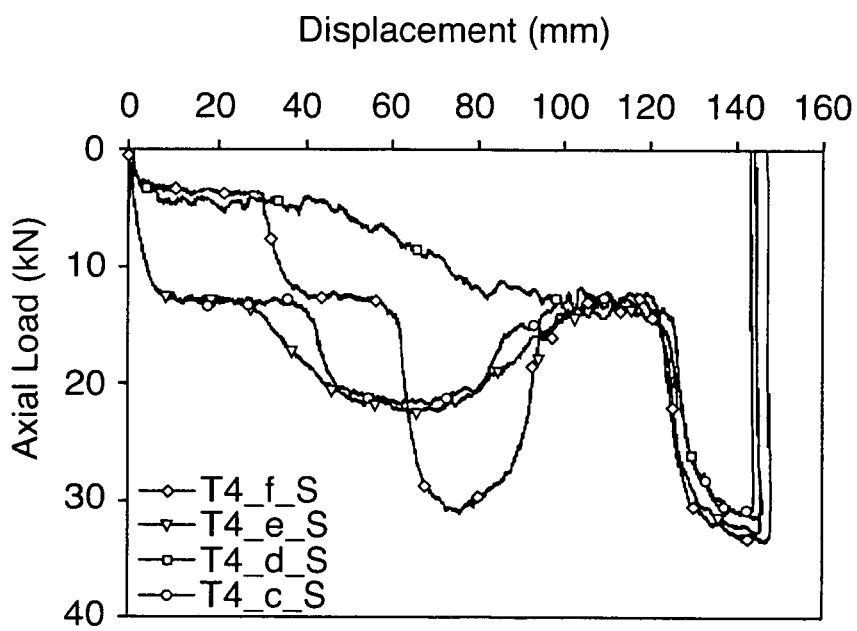
Figure 22A:
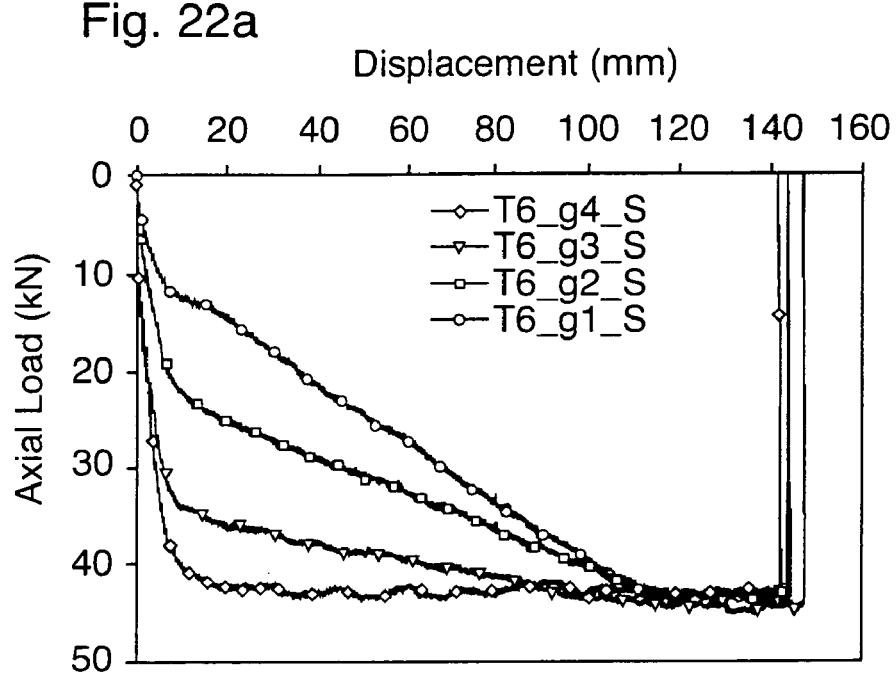
FIGS. 22a and 22b show graphically the Load/displacement profiles for test T6 and T4 deformation tubes having the geometry shown in FIG. 13e using a single cutter under quasi-static loading.
Figure 22B:
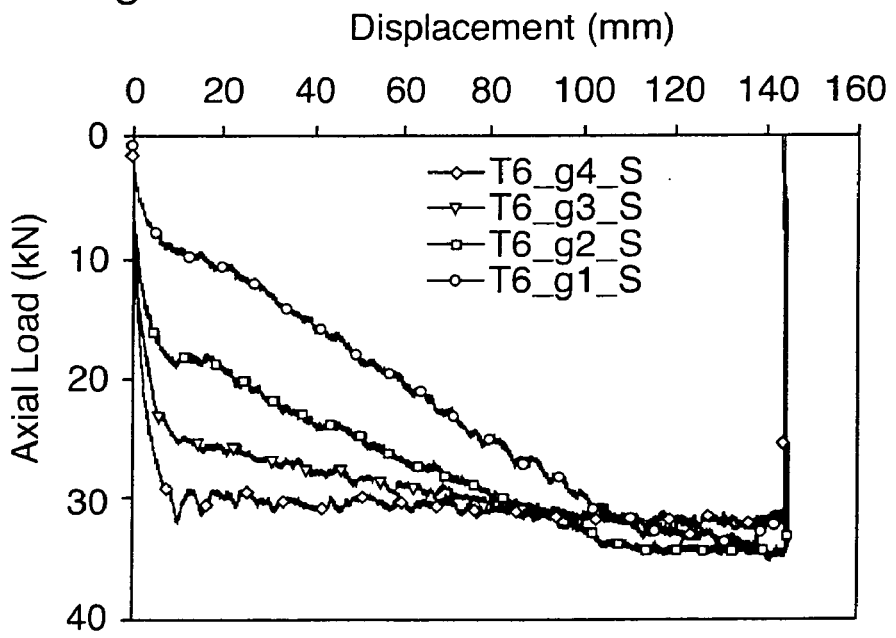
Figure 23:
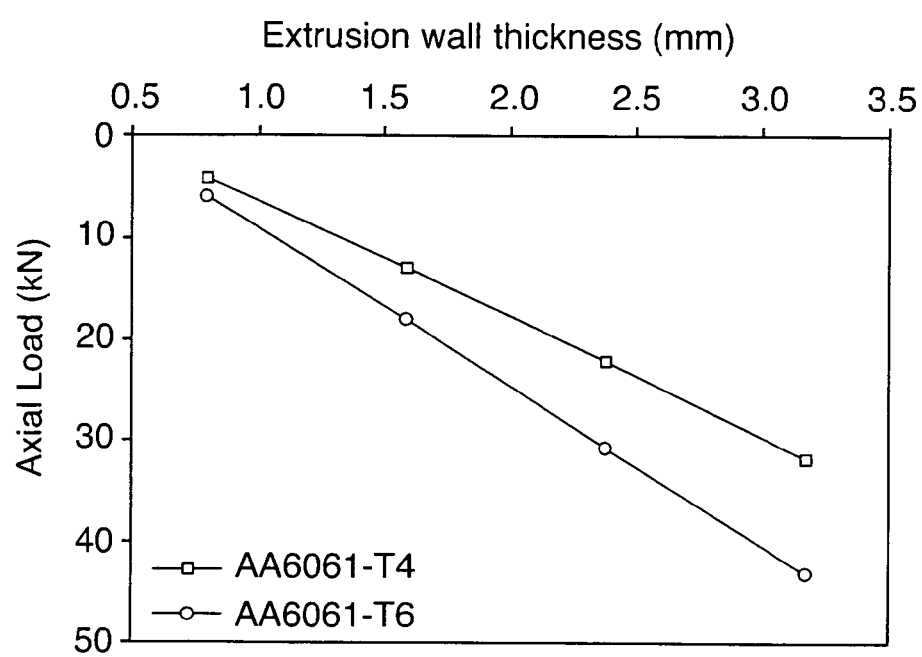
FIG. 23 shows graphically the relationship between steady state force and extrusion and the wall thickness of the deformation tube for the test T6 and T4 extrusions using a single cutter under quasi-static loading.
Figure 24A:
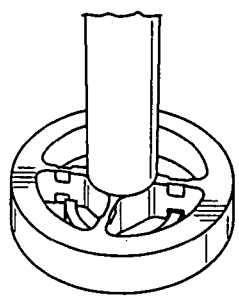
FIGS. 24a to 24h show a top view of the relative axial movement of a cutter/deflector plate into a deformation tube in the dissipation and absorption of shock energy forces in accordance with a preferred embodiment of the invention.
Figure 24B:
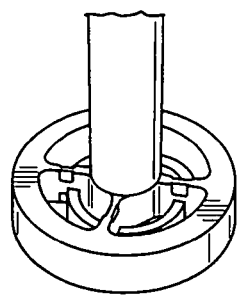
Figure 24C:
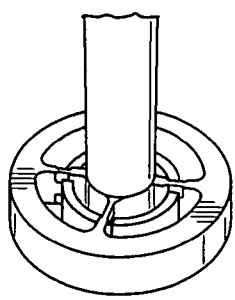
Figure 24D:
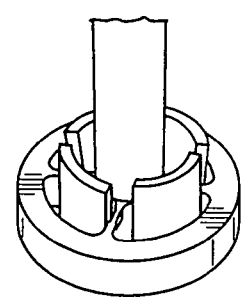
Figure 24E:
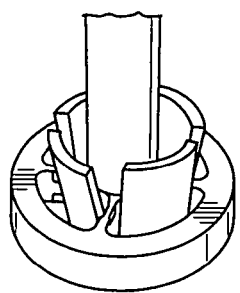
Figure 24F:
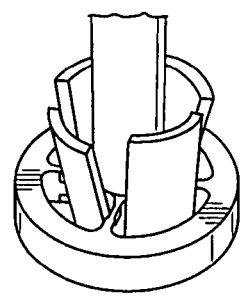
Figure 24G:
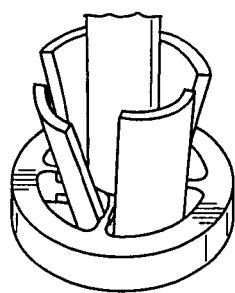
Figure 24H:
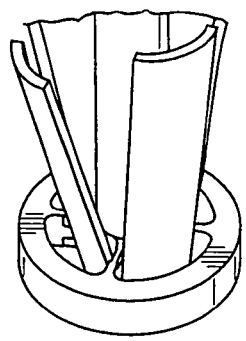

Five geometries of extrusions with variation in wall thicknesses as shown in FIGS. 13a-13e were considered for the cutting tests without the presence of a deflector 158. Tapered and stepped changes of the wall thickness were implemented into these geometries. FIGS. 21a and 21b illustrate the load/displacement profiles for the T6 and T4 temper extrusions 12x with geometries as shown in FIGS. 13a-13e cut quasi-statically by a single cutter, respectively. FIGS. 22a and 22b illustrate the load/displacement profiles for the T6 and T4 temper extrusions 12x having the geometry as shown in FIG. 13e (Y=0.25t, 0.5t, 0.75t, and t) cut quasi-statically by a single cutter, respectively. No material fracture was observed throughout these cutting tests. The changes of the cutting load followed the changes of the wall thickness of the tube extrusion 12x for both tempers. The observed steady state cutting forces for T6 temper extrusions 12x with wall thicknesses of 0.25t, 0.5t, 0.75t and t were observed to be 6.0 kN, 18.2 kN, 30.9 kN, and 43.3 kN, respectively. The observed steady state cutting forces for T4 temper extrusions with wall thicknesses of 0.25t, 0.5t, 0.75t and t were observed to be 4.3 kN, 13.2 kN, 22.3 kN, and 32.0 kN, respectively. The relationship of the steady state cutting force and the instantaneous extrusion wall thickness for both temper extrusion is presented in FIG. 23. As can be seen from FIG. 23, an almost linear relationship between the steady state cutting force and the extrusion wall thickness for both temper extrusions 12x was observed.

Control of Load/Displacement and Energy Absorption

As described, control of the load/displacement of AA6061-T6 and T4 circular extrusions 12x can be accomplished through the variation of the sidewall thickness of the tubular extrusion 12x in the axial direction. Although the total energy absorption of an extrusion 12x experiencing a single cutting deformation mode is usually not as efficient as the same extrusion undergoing a progressive folding deformation mode, it is much more efficient than a global bending deformation mode. When a dual stage cutting mode is applied, the total energy absorption of an extrusion surpasses that of a progressive folding mode. Knowing the relationship between the mean cutting force and the extrusion wall thickness for the cutting deformation mode, and the relationship between the peak crush force and the extrusion wall thickness for the progressive folding or global bending mode, an adaptive energy absorption system axial cutting of an extrusion can be designed through the control of the desired load/displacement profiles under different axial loading conditions. Material fractures will slightly reduce the efficiency of the adaptive energy absorption system. Test examples show that the T4 temper extrusion 12x had minor material fracture but more work hardening. Thus, if desired load/displacement responses of the tubular extrusion 12x are similar under both dynamic and quasi-static loading conditions, the use of T4 material temper in the formation of the deformable tubular extrusion 12x is appropriate. However, the mean cutting force may increase slightly due to the work hardening.

The use of T6 temper material in the formation of the deformable tubular extrusion 12x is a good candidate for desired constant mean cutting force response under quasi-static loading. When dynamic loading is applied to this material, the mean cutting force will be reduced due to significant material fracture occurring on the petalled sidewalls, which will further reduce the energy absorption efficiency of the system.

Application Axial cutting tests of circular AA6061-T6 and T4 tubular extrusions 12*x* under both dynamic and quasi-static loading conditions were completed using the cutter/deflector assembly 114 or cutter only. Variations of sidewall thickness were implemented on the tubular extrusions 12*x* to investigate the capability of controlling load/displacement responses and energy absorption characteristics of both T6 and T4 temper specimens under the cutting deformation modes.

Based upon experimental observations and testing results, the applicant has appreciated that a preferred energy dissipation assembly 10 may be provided having regard to one or more of the following:

1. The cutting deformation modes under both dynamic and quasi-static loading conditions are stable and controllable.
2. Five energy dissipation mechanisms were observed for tubular extrusions under both dynamic and quasi-static cutting deformation modes, namely, cutting deformation in the vicinity of the cutter blade tip, circumferential membrane stretching of the tubular extrusion, outward bending of petalled tubular extrusion sidewalls, far-field sidewall material fracture, and friction between the cutter blade and the extrusion sidewall.
3. The ratio of dynamic to quasi-static values of averaged mean cutting force was observed to be 0.92 and 1.09 for tubular extrusions subjected to single stage cutting deformation.
4. The load/displacement responses of the tubular extrusions generally varied with the geometric change of the extrusions under both dynamic and quasi-static loadings. The observed linear relationship between the mean cutting force and the extrusion wall thickness under quasi-static loading can be used to design a desired energy absorption response. With the presence of the deflector, the mean cutting force was slightly reduced and resulted in slightly lower energy absorption. While both T6 and T4 materials are good candidates under quasi-static loading, the T4 material might be a better choice under dynamic loading because of minor or no material fracture occurrence on the petalled tube side walls. Use of the T6 temper under dynamic cutting test will result in the mean cutting force being slightly reduced with force oscillation due to material fractures.
5. A system can be configured as an adaptive energy absorption system with desired load/displacement profiles for extrusions having variable wall thickness.

Features for Adaptive Energy Dissipation Devices in Accordance with the Present Invention Include:

1. Experimental status were conducted using round aluminum tubes, however the deformation member may be any configuration or form of structure that has walled cross section, and which is able to be load bearing along its length.
2. The deformation member may be designed to any length provided that the active load applied by the blade(s) does not cause the member to bend along its length beyond its elastic buckling limit.
3. The size of the cross section may be scaled to any size based on the load/displacement requirement and energy that the system is to absorb.
4. The material used for the tubular deformation extrusions 12*x* member was aluminum, however the deformation member may be any ductile deformable material of consistent and predictable mechanical properties including, without restriction, other metals such as zinc, as well as plastics, composites and gels.
5. The sacrificial deformation member may be formed as a combination and/or a sequence of materials.
6. The wall stalk (thickness) of the deformation tube may be uniform or may be designed to vary along its length or within the cross section to meet the energy dissipation and force/displacement requirements. The cross sectional load bearing capabilities of the deformation member should exceed the maximum load placed on it by the blade(s) above that section.
7. The design of the deformation member should have a load bearing capacity that is greater than the maximum load applied by the blades in the system.
8. In extrusion testing the cutting blades were constructed of heat treated SAE 4140 steel, however blades of other hardened materials and having a higher ultimate strength than the material used in the deformation member so as to not cause deformation of the blade(s). Further, the blade material should not be brittle in nature. Blade material may be an alloyed material; a combination of materials; and/or coated material.
9. The number of blades 34 in the assembly 10 can be altered for the force/displacement and energy dissipation requirements.
10. Blades 34 may be stacked (in series) with a following blade offset to the first entry blade creating a new cut(s) in the cross section of the deformation member.
11. The blade 34 preferably designed to create high resistance force at it cuts through the deformation member. This may be achieved in the cross section of the blade 34 where the entry face of the blade 34 is flat and at an angle of approximately 90° to the direction of blade travel creating high compressive force at in front of this area of the blade 34. As the blade 34 enters the material of the deforming member (i.e. tube 12) it exceeds the elastic limit of the deformation member material and the material at either side of the flat face shears. The initiation of the shear is assisted by the hard angle between the flat face and the angled walls back from the face. This configuration also minimizes advanced crack propagation ahead of the cutting face of the blade 34. As the blade 34 moves further into the material of the deformation tube 12 or member the wedge angle on both sides of the blade push on the side wall material of the cut creating additional friction as it deforms the deformation member in this area while serving to increase the curve of the cut allowing the blade to continue through the material.
12. The resistance force of the blade 34 through the deformation tube 12 or compressive member increases with the width of the flat front face and the overall width of the blade 34.
13. The energy dissipation of the blade 34 travelling through the deformation tube 12 or member is only related to distance travelled irrespective of the rate of travel of the blade 12 through the material if the deforming materials are selected appropriately.
14. Algorithms and related software that is able to predict system load resistance given deformation material characteristics; wall stalk (thickness); blade design; and number of blades or in the case of stacked blades the number in each stack and the vertical distance between front faces of blades.
15. Algorithms and software that given the load force resistance required is able to determine material characteristics required for the deformation member along with wall stalk and the corresponding blade design and number required.

16. Algorithms and software that is able to predict the force curve with variable wall stalk in the deformation tube 12 or member and also design a deformation member with variable wall stalk to match a required force or load curve.
17. The energy absorption of the energy dissipation apparatus 10 is not affected by temperature changes within the range of normal inhabitable temperature extremes.
18. The force/displacement response is highly reproducible and for selected materials for a given application (or operating range) is independent of the rate of deformation.
19. The energy dissipation apparatus 10 can be designed to exhibit variable force/displacement response during deformation.
20. Mechanical adjustments may be made to change/adjust the force response of the device
21. The energy dissipation apparatus 10 can be designed with a constant force/displacement relationship selected for ideal energy dissipation in a preselected application. The magnitude of the constant force can be designed into the device.
22. Under high speed impact loading conditions, the energy dissipation apparatus 10 may act as a mechanical low pass filter. High frequency, large magnitude, impact forces (at the impact site at the cutter) are attenuated by the deformation process and not passed through the system to a supported end of the apparatus 10.

SYMBOLS

As used herein the following symbols and abbreviations have the following meanings

| NOTATION | |
|---|---|
| b | width of a square extrusion |
| B | half of the nominal blade shoulder width |
| D | mean diameter of a circular extrusion |
| $D_o$ | outer diameter of a circular extrusion |
| E | Young's modules |
| L | length of an extrusion |
| $L_{cr}$ | critical length of an extrusion |
| $P_m$ | mean axial cutting force |
| $P_{max}$ | maximum axial cutting force |
| t | wall thickness of the extrusion |
| T | cutter nominal blade tip width |
| $\sigma_y$ | material yield stress |
| $\sigma_u$ | material ultimate stress |
| x | axial cutting direction |
| $D_t$ | outer diameter of deformation tube |
| $D_i$ | inner diameter of cutter support ring |
| ABBREVIATIONS | |
| AA | aluminium alloy |
| ASTM | American Society for Testing and Materials |
| CFE | crush force efficiency |
| CNC | computer numeric control |
| IEPE | integrated electronic piezoelectric |
| LVDT | linear voltage differential transformer |
| SEA | specific energy absorption |
| TEA | total energy absorption |

We claim:

1. An energy dissipation system for dissipating kinetic Shock energy including;
   an aluminum tubular member, said tubular member extending longitudnially along an axis from a first end portion to a second end portion, said tubular member having a longitudinal legnth selected at between 5 and 50 cm and a radial diameter of about 4 to 10 cm,
   at least one hardened cutter/deflector plate disposed adjacent to said first end portion, each cutter/deflector plate including three to five cutting blade members wherein on the occurrence of said shock energy, said cutting blades being movable longitudinally relative to said tubular member towards said second end portion, wherein longitudinal movement of the cutting blades through the tubular member cuts and/or deforms said tubular member to assist in absorbing said kinetic energy.

2. The energy dissipation system as claimed in claim 1 including at least two stacked cutter/deflector plates.

3. The energy dissipation system as claimed in claim 1, wherein each said cutter/deflector plate includes a centrally disposed hub, a support ring spaced radially outwardly from said hub, said cutting blade members spanning between and being integrally at each respective end with each of said hub and support ring.

4. The energy dissipation system as claimed in claim 3, wherein said hub is coaxially aligned with said axis, and said support ring extends concentrically about each of said hub and said first end portion.

5. The energy dissipation system as claimed in claim 4, wherein said kinetic shock energy is generated by an explosive device.

6. An armoured vehicle including the energy dissipation system of claim 1, having an interior floor pan and an exterior floor pan spaced a distance from the interior floor pan and defining a space therebetween,
   the energy dissipation system being disposed within the space with the second end portion. being coupled to the interior floor pan and the at least one cutter/deflector plate being coupled to the exterior floor pan, such that movement of the exterior floor pan towards the interior floor pan effects longitudinal movement of the at least one cutter/deflector plate axially towards the second end.

7. The armoured vehicle as claimed in claim 6, wherein the exterior floor pan Includes a pocket sized to receive at least part of the tubular member therein, the pocket being positioned substantially coaxial in alignment with said tube axis.

8. The energy dissipation system as claimed in claim 1 for use in a highway crash barrier having a vehicle barrier and a support, the tubular member being coupled to the vehicle barrier and said at least cutter/deflector plate being coupled to the support.

9. The energy dissipation system as claimed in claim 8, wherein said tubular member has a substantially constant sidewall thickness.

* * * * *